T

(12) United States Patent
Harper et al.

(10) Patent No.: US 9,208,007 B2
(45) Date of Patent: Dec. 8, 2015

(54) OPEN RESILIENCE FRAMEWORK FOR SIMPLIFIED AND COORDINATED ORCHESTRATION OF MULTIPLE AVAILABILITY MANAGERS

(75) Inventors: Richard E. Harper, Chapel Hill, NC (US); Kyung D. Ryu, New City, NY (US); Lisa F. Spainhower, Highland, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 55 days.

(21) Appl. No.: 13/352,883

(22) Filed: Jan. 18, 2012

(65) Prior Publication Data

US 2013/0185667 A1     Jul. 18, 2013

(51) Int. Cl.
*G06F 15/173* (2006.01)
*G06F 11/07* (2006.01)
*G06F 9/50* (2006.01)
*G06F 11/14* (2006.01)

(52) U.S. Cl.
CPC ........ *G06F 11/0709* (2013.01); *G06F 11/0751* (2013.01); *G06F 9/5072* (2013.01); *G06F 11/1484* (2013.01)

(58) Field of Classification Search
None
See application file for complete search history.

(56) References Cited

U.S. PATENT DOCUMENTS

| | | | |
|---|---|---|---|
| 7,111,086 B1 * | 9/2006 | Ecoleston et al. | 710/33 |
| 7,228,453 B2 * | 6/2007 | O'Brien et al. | 714/13 |
| 8,413,144 B1 * | 4/2013 | Manmohan et al. | 718/1 |
| 2005/0044129 A1 | 2/2005 | McCormack et al. | |
| 2006/0253745 A1 * | 11/2006 | Maso et al. | 714/47 |
| 2009/0003194 A1 | 1/2009 | Schelen et al. | |
| 2009/0157855 A1 | 6/2009 | Adam et al. | |
| 2010/0287264 A1 | 11/2010 | Lopes | |

FOREIGN PATENT DOCUMENTS

WO     2006041373 A1     4/2006

OTHER PUBLICATIONS

International Search Report and Written Opinion dated Feb. 26, 2013 from related application PCT/US12/70059.
"Amazon Elastic Compute Cloud: API Reference", Amazon Web Services LLC, May 2011.
"Amazon Elastic Compute Cloud: Command Line Tools Reference", Amazon Web Services LLC, May 2011.
"Amazon Elastic Compute Cloud: Getting Started Guide", Amazon Web Services LLC, May 2011.
"Amazon Elastic Compute Cloud: User Guide", Amazon Web Services LLC, May 2011.
Bedoya, H., et al., "Implementing PowerHA for IBM i", International Technical Support Organization, Nov. 2008.
Quintero, D., et al., "IBM Systems Director VMControl Implementation Guide on IBM Power Systems", International Technical Support Organization, Mar. 2010.

(Continued)

*Primary Examiner* — Joshua Joo
*Assistant Examiner* — Younes Naji
(74) *Attorney, Agent, or Firm* — Scully, Scott, Murphy & Presser, P.C.; Daniel P. Morris, Esq.

(57) ABSTRACT

Availability manager orchestration systems and methods and, particularly, an open resilience framework for simplified and coordinated orchestration of multiple availability managers.

25 Claims, 10 Drawing Sheets

(56) References Cited

OTHER PUBLICATIONS

Tranoris, C., et al., "A workflow on the dynamic composition and distribution of orchestration for testbed provisioning", Ultra Modern Telecommunications & Workshops, ICUMT '09, Dec. 2009.

Ackerman, K.J., "IBM WebSphere Test 000-377 Study Guide WebSphere Application Server Network Deployment V7.0 Core Administration", International Business Machines Corporation, Feb. 2010.

Kyne, F., et al., "GDPS Family—An Introduction to Concepts and Capabilities", International Technical Support Organization, Aug. 2010.

Ryder, M., "Availability Management: A CA Service Management Process Map", Technology brief: Availability Management, 2009.

Automating High Availability (HA) Services with VMware HA', provided by VMware-Intel, May 2007.

Chappell, C., et al., "Preparing for Cloud Computing: The Managed Services Revolution", Heavy Reading, Nov. 2008.

"Powerful Protection Against Application and Server Downtime", VERITAS™ Cluster Server, 2003.

"IBM Tivoli System Automation Application Manager", International Business Machines Corporation, May 2008.

"Microsoft Cluster Service", http://thechnet.microsoft.com/en-us/library/bb742593(d=printer).aspx, last updated Jun. 9, 2001.

Jackson, J., "Microsoft Cracks Live Migration Problem", PC World, Sep. 16, 2011.

"Amazon Elastic Compute Cloud: Quick Reference Card: p. 1-2", Amazon Web Services, May 2011.

http://publib.boulder.ibm.com/infocenter/director/sdk/index.jsp?topic=/com.ibm.vmcontrol.ws.doc/html/vmc2_2_api_sdk.html, "The IBM Systems Director VMControl SDK", printed Jan. 2012.

* cited by examiner

OPEN RESILIENCE FRAMEWORK FOR SIMPLIFIED AND COORDINATED ORCHESTRATION OF MULTIPLE AVAILABILITY MANAGERS

BACKGROUND

The present disclosure relates generally to availability manager orchestration systems and methods and, particularly, to an open resilience framework for simplified and coordinated orchestration of multiple availability managers.

DESCRIPTION OF RELATED ART

It is conventionally very challenging to properly manage an IT system's resilience (a broad concept that includes Fault Tolerance ("FA"), High Availability ("HA"), Disaster Tolerance, and Planned Outages). There are typically significant difficulties in customers' ability to describe, clarify, and quantify availability mechanisms, and in their ability to configure, operate, and monitor these availability mechanisms. Further, various customer engagements and surveys have highlighted a customer need to be able to more easily understand the effectiveness, performance, and costs of utilizing the various availability mechanisms that can be provided in today's and future virtualized IT infrastructures.

Present-day application availability management technologies in themselves (such as HA clustering) are typically notoriously complex to analyze, install, configure, deploy, and operate. When commercial Unix (and to a lesser extent Microsoft) HA clusters were introduced by major vendors in the early- to mid-1990s, it was anticipated that the relatively inexpensive technology (compared to proprietary FT that preceded it) would become ubiquitous. However, the limitations of human cost and skill—driven by complexity—have traditionally limited their adoption. To this day this typically remains a serious impediment to customer exploitation of these technologies.

In addition, customer workloads along with their embedded availability management are increasingly deployed on virtual infrastructures which may have their own availability management functionality. While the former typically provide more precise recovery, and the latter are typically somewhat easier to configure and much broader in application scope, the potentially (destructive and constructive) interactions between the white box availability management and the black box availability management make coherent availability management of such structures even more daunting.

One conventional mechanism is provided by VMware and Veritas Clustering Service. In this configuration, VMware provides the black box availability management functionality, and Veritas Clustering Service provides the white box availability management functionality. VMware has provided a very complex interface into their proprietary virtualization management functionality that is used by the Veritas Clustering Service to interact tightly with the virtualization layer to achieve its white box availability objectives. The Veritas code then has to be modified to operate within the VMware environment, using these interfaces. This type of configuration is typically extremely restrictive, cumbersome, and limited in that it is typically restricted to a single virtualization layer provider (e.g., VMware) and typically requires virtualization-layer-specific modifications to the white box availability manager (e.g., Veritas) to achieve coordinated availability management.

SUMMARY

Various embodiments provide a mechanism for allowing a user to specify his or her resilience goal at a level of abstraction that is meaningful to that user, and then automatically initializing and configuring the white box and the black box availability managers to meet the resilience goals (of course, various embodiments may be applied in the context of one user or multiple users). In one example, various embodiments provide a novel systems management component called the "Resilience Framework Orchestrator" that, based on the user's input and the availability managers that are deployed in the user's environment, automatically computes the optimal configuration parameters and settings, and then configures the availability managers using their existing interfaces and behaviors, in such a way that the internal operation of the availability managers is not modified and, in many cases, in such a way that the availability managers need not be aware that they are operating within a composed system of availability managers. Thus, various embodiments of the present invention address a customer complexity issue (by reducing complexity exposed to the user), and are intended to be useful in a wide range of black box and white box availability manager systems and environments.

Further, various embodiments may provide for one or more of:

Provision of a simplified "Resilience Tier" user interface that abstracts away and defines the capabilities and behavior of multiple availability management systems responsible for managing multiple levels of an IT hierarchy, such as hardware, virtualization infrastructure, virtual machines, operating systems, middleware, and application-level resources.

Within a Resilience Tier, usage of a customer-specified Figure of Merit ("FOM") to indicate the customer's maximum allowable probability of application outage (such as, but not limited to, maximum allowable probability of service level agreement ("SLA") violation).

Based on this maximum allowable probability of application outage and the Resilience Tier selected, perform automatic determination of the optimal allocation and placement of application, virtual, and physical resources (automatic generation of spatial composition goals).

Based on this maximum allowable probability of application outage and the Resilience Tier selected, perform automatic determination of the behavior desired of the component availability managers (automatic generation of behavioral composition goals).

Automatically transforming the spatial and behavioral constraints into the input semantics and syntax that is consumable by the component availability managers.

Automatically initializing and configuring the component availability managers with the transformed spatial and behavioral constraints. This may be done without requiring any internal modifications to the component availability managers, and without requiring that the component availability managers be aware that they are operating in a composed collection of availability managers.

Automatically orchestrating any needed interactions between the component availability managers to ensure that they interoperate smoothly and properly.

In another embodiment, a computer-implemented system for configuring at least a first availability manager and a second availability manager is provided, comprising: a user interface, wherein the user interface receives from a user an availability management goal associated with at least: (a) the first availability manager, and (b) the second availability manager; a processing element in operative communication with the user interface, wherein the processing element determines, based at least in part upon the availability management goal: (a) at least one setting associated with the first availability manager, and (b) at least one setting associated with the second availability manager; and a control element in operative communication with: (a) the processing element, (b) the first availability manager, and (c) the second availability manager; wherein the control element receives from the processing element the at least one setting associated with the first availability manager and provides to the first availability manager the associated setting; and wherein the control element receives from the processing element the at least one setting associated with the second availability manager and provides to the second availability manager the associated setting.

In another embodiment, a method implemented in a computer system for configuring at least a first availability manager and a second availability manager is provided, comprising: providing a user interface, wherein the user interface receives from a user an availability management goal associated with at least: (a) the first availability manager, and (b) the second availability manager; determining, based at least in part upon the availability management goal: (a) at least one setting associated with the first availability manager, and (b) at least one setting associated with the second availability manager; providing the at least one setting associated with the first availability manager to the first availability manager; providing the at least one setting associated with the second availability manager to the second availability manager; and running a program using a processor unit to execute one or more of said steps of: (a) providing a user interface; (b) determining; (c) providing the at least one setting associated with the first availability manager to the first availability manager; and (d) providing the at least one setting associated with the second availability manager to the second availability manager.

In another embodiment, a program storage device readable by machine, tangibly embodying a program of instructions executable by the machine to perform a method for configuring at least a first availability manager and a second availability manager is provided, said method comprising: providing a user interface, wherein the user interface receives from a user an availability management goal associated with at least: (a) the first availability manager, and (b) the second availability manager; determining, based at least in part upon the availability management goal: (a) at least one setting associated with the first availability manager, and (b) at least one setting associated with the second availability manager; providing the at least one setting associated with the first availability manager to the first availability manager; providing the at least one setting associated with the second availability manager to the second availability manager; and running a program using a processor unit to execute one or more of said steps of: (a) providing a user interface; (b) determining; (c) providing the at least one setting associated with the first availability manager to the first availability manager; and (d) providing the at least one setting associated with the second availability manager to the second availability manager.

BRIEF DESCRIPTION OF THE DRAWINGS

The drawings are provided for illustrative purpose only and do not necessarily represent practical examples of the present invention to scale. In the figures, same reference signs are used to denote the same or like parts.

DETAILED DESCRIPTION OF THE INVENTION

Figure 1:
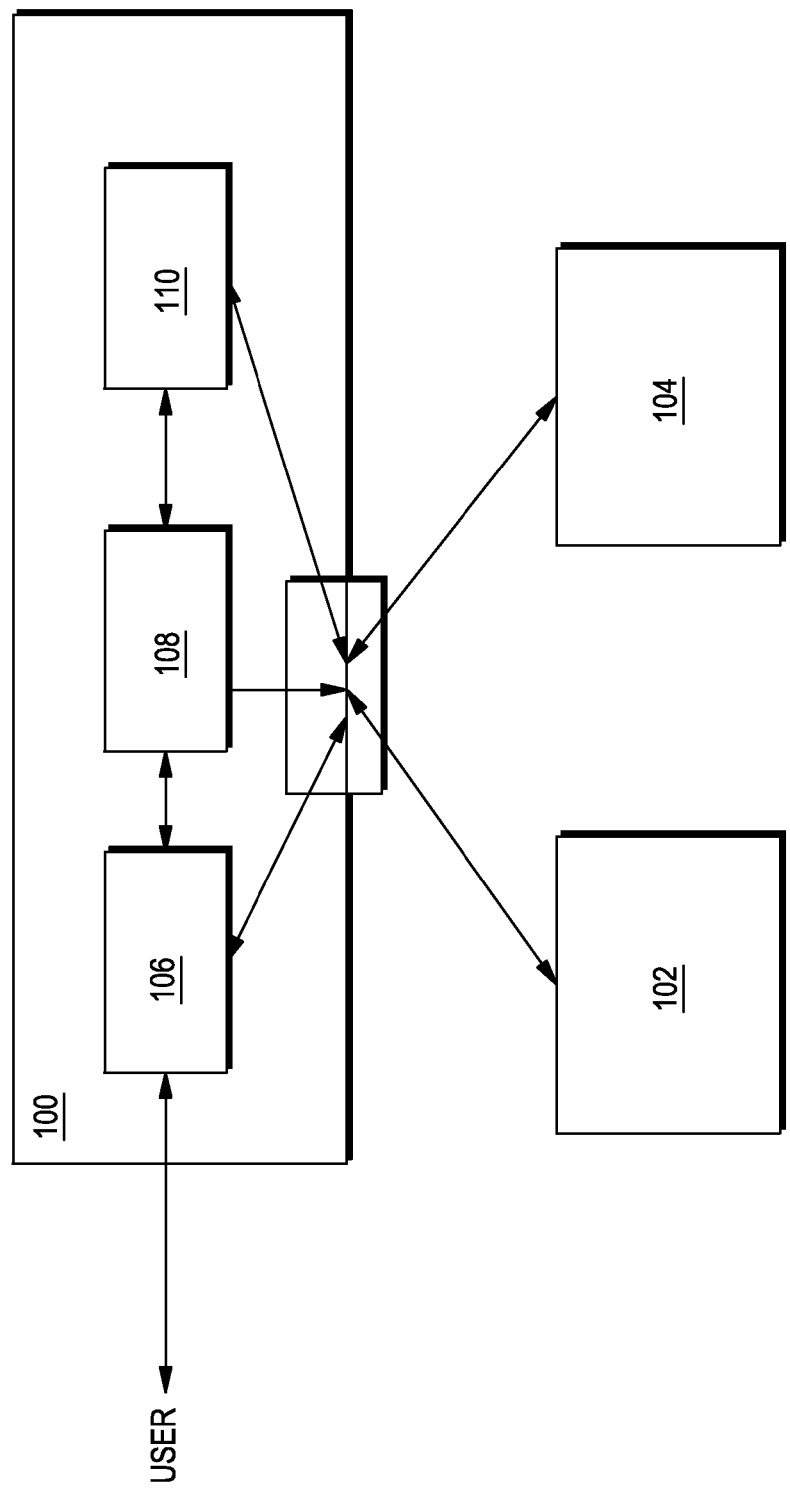
FIG. 1 is a block diagram of a system according to an embodiment of the present invention.

For the purposes of describing and claiming the present invention the term "availability manager" or ("AM") is intended to refer to a systems management element (e.g., comprising program code and/or hardware) that detects and responds to failures and other undesired anomalies (e.g., at different levels) in an information technology ("IT") environment.

For the purposes of describing and claiming the present invention the term "white box availability manager" is intended to refer to an availability manager that detects and responds to failures associated with one or more application-level resources ("hereafter sometimes referred to as "application resources" or "AR's") such as, for example, an operating system process, a container, a file system, a storage device, a disk volume, a network interface, or an IP number (address).

For the purposes of describing and claiming the present invention the term "black box availability manager" is intended to refer to an availability manager that detects and responds to failures associated with one or more virtual machines ("VM") or Logical Partitions ("LPAR").

For the purposes of describing and claiming the present invention the term "availability management goal" is intended to refer to one value selected from a set of quantized values, wherein the set of quantized values characterize operation of a plurality of interrelated availability managers (in one example, the quantized values may be expressed in terms that are meaningful to a user). Of note, the quantized values may be quantitative (e.g., specific numbers or ranges of numbers) or the quantized values may be qualitative (e.g., descriptors such as "Good", "Better", "Best"; or "Gold", "Silver", "Bronze"; or "Value", "Standard", "Enterprise"). In another example, the quantized values may comprise "Tiers". In another more specific example, the quantized values may comprise "Resilience Tiers" (such "Resilience Tiers" may, for example, relate to a level of probable service reliability).

For the purposes of describing and claiming the present invention the term "spatial composition" is intended to refer to how a plurality of IT resources are placed relative to one another (e.g., so as to limit the effects of failures).

For the purposes of describing and claiming the present invention the term "behavioral composition" is intended to refer to how a plurality of availability managers are configured to work together to react to failures (e.g., so as to limit the effects of failures).

For the purposes of describing and claiming the present invention the term "grammatical construct" is intended to refer to information (e.g., scripts, configuration files, or the like) that is in a form understandable by a given availability manager such that the given availability manager is able to act upon the information presented in such a grammatical construct. In one example, a grammatical construct may include semantics and syntax.

For the purposes of describing and claiming the present invention the term "real time" is intended to refer to cause and effect occurring approximately contemporaneously in time (e.g., without significant time lag between cause and effect but not necessarily instantaneously).

With reference now to FIG. 1, a computer-implemented system 100 according to an embodiment of the present invention is shown. The system 100 is for configuring at least a first availability manager 102 and a second availability manager 104. The system 100 includes a user interface 106, wherein the user interface 106 receives from a user an availability management goal associated with at least: (a) the first availability manager 102, and (b) the second availability manager 104. Further, a processing element 108 is in operative communication with the user interface 106, wherein the processing element 108 determines, based at least in part upon the availability management goal: (a) at least one setting associated with the first availability manager 102, and (b) at least one setting associated with the second availability manager 104. Further still, a control element 110 is in operative communication with: (a) the processing element 108, (b) the first availability manager 102, and (c) the second availability manager 104; wherein the control element 110 receives from the processing element 108 the at least one setting associated with the first availability manager 102 and provides to the first availability manager 102 the associated setting; and wherein the control element 110 receives from the processing element 108 the at least one setting associated with the second availability manager 104 and provides to the second availability manager 104 the associated setting.

Figure 2:
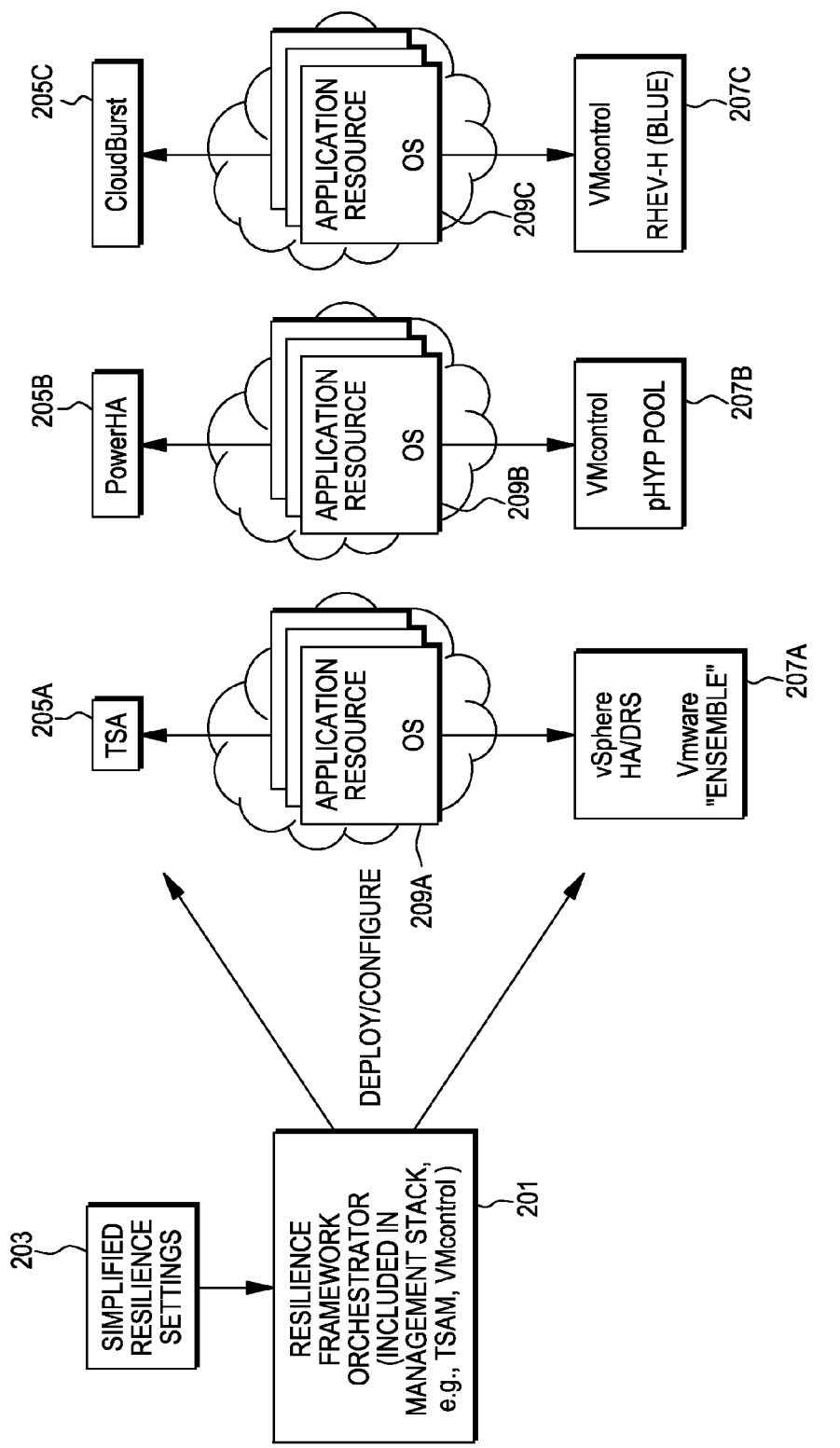
FIG. 2 is a block diagram of a system according to an embodiment of the present invention.

With reference now to FIG. 2, a Resilience Framework Orchestrator systems management component (shown as Resilience Framework Orchestrator 201), according to an embodiment of the present invention is shown. As seen in this FIG. 2, Resilience Framework Orchestrator 201 may consume simplified resilience settings 203 from a user interface (not shown) and then orchestrate the deployment and configuration of white box availability managers and black box availability managers as described herein. In one example, the functionality associated with Resilience Framework Orchestrator 201 may reside where shown in this FIG. 2. In another example the functionality associated with Resilience Framework Orchestrator 201 may reside elsewhere in the system. In another example, Resilience Framework Orchestrator 201 may be productized as a component of an existing systems management product (e.g., IBM Systems Director, a Tivoli product such as TSAM, or both). Of note, this FIG. 2 shows that the orchestration is applicable to a range of white box availability managers (e.g., TSA 205A, PowerHA 205B, and WebSphere Cloudburst 205C) and black box availability managers (e.g., VMware 207A, VMControl 207B and VMControl 207C). As described herein, the white box availability managers are responsible for managing the availability of ARs 209A, 209B, 209C, which are resources typically managed conventionally by an HA (high-availability) infrastructure. Also as described herein, the black box availability managers are responsible for managing virtual machines or logical partitions, with no knowledge of their contents or inner workings. While much of the discussion herein focuses on usage of the IBM Tivoli System Automation product as the white box availability manager and the IBM VMControl product as the black box availability manager, it should be understood that those are examples only, do not represent limitations as to scope, and are intended to be illustrative (not restrictive).

As described herein, various embodiments may be applied in the context of IT environments where multiple availability managers are installed and need to work together.

In various examples, embodiments may be applied to IT environments in which black box availability managers (e.g., VMware HA Services, IBM's VMControl, and Cloud-based Availability Managers such as in Amazon EC2) and white box availability managers (e.g., Veritas Cluster Services, Microsoft's Cluster Services, IBM's Tivoli System Automation, and IBM's PowerHA) are in use (and could be used together beneficially).

In one example, embodiments may be implemented by a "Resilience Framework Orchestrator" (e.g., a software component; a hardware component; or a component comprising a combination of software and hardware).

Other examples may provide for one or more of:

Simplified Availability Specification via Quantized Resilience Tiers. Conventional configuration of single availability managers is typically notoriously difficult. Configuration of interacting availability managers to work well together, such as in the context of this disclosure, is expected (in the absence of the present invention) to be very difficult (if not almost impossible). Thus one contribution of an embodiment of the invention is to simplify the specification of availability management goals by defining a small set of quantized user-visible "Resilience Tiers" that are expressed in terms that are meaningful to the customer. (These could also be called Levels, Policies, Goals, or Objectives. In this disclosure we will use the generic term "Resilience Tier" with the understanding that it exemplifies this general concept.) For example, the customer may select from among Good, Better, Best; or Gold, Silver, Bronze; or Value, Standard, Enterprise, or even a quantitative figure of merit such as an Service Level Agreement probability that has been suitably quantized. Of note, it is important to emphasize that various embodiments provide for quantizing the universe of availability manager behaviors into a certain well-defined set of behaviors that are meaningful to the customer, not a particular set of Tiers or Tier definitions themselves. Of further note, specific Resilience Tiers can be determined in a variety of ways, such as either algorithmically (e.g., by calculating every combination of behaviors of each availability manager in the system, and letting one Resilience Tier represent each combination), or manually (e.g., by having a person who is familiar with the various availability managers define the Resilience Tiers based on an analysis and understanding of their capabilities and interactions).

Transformation of Availability Specification into Spatial and Behavioral Composition Goals. This application discloses the concepts of spatial and behavioral composition and shows how they can be adjusted to fulfill a selected Resilience Tier. In this regard, it is noted (as defined above) that spatial composition describes how the IT resources are placed relative to each (e.g., other so as to limit the effects of failures). For example, placing all Virtual Machines on a single physical server, while minimizing the number and hence cost of physical servers, leaves them all subject to the failure of that single physical server, whereas distributing them across a number of physical servers reduces that vulnerability. The former may make sense for a lower Resilience Tier, whereas the latter may be needed for a higher Resilience Tier. Disclosed herein is the automatic determination of the optimal allocation and placement of application, virtual, and physical resources (automatic generation of spatial composition), based on the Resilience Tier selected, that is necessary to meet that Resilience Tier's requirements. Further, behavioral composition (as defined above) refers to how the various availability managers in the system are configured to work together to react to failures (e.g., so as to limit the effects of failures). For example, in some Resilience Tiers, the block box availability manager could be disabled from handling failures, yet the white box availability manager could be enabled. Or (for example), if there is no white box availability manager installed (such as, for lower cost), then the black box availability manager alone would be responsible for handling failures. Based on the Resilience Tier selected and the capabilities of the various installed availability managers, we disclose the automatic determination of the behavior of each availability manager so as to meet that Resilience Tier's requirements.

Transformation of Spatial and Behavioral Composition Goals into Availability Manager Grammar. As described herein, the concepts of a quantized set of Resilience Tiers and the spatial and behavioral compositions that characterize them, independent of any given availability manager have been disclosed. Translation of those spatial and behavioral constraints into the grammatical constructs (e.g., scripts, configuration files, or the like) that each availability manager in a given installation understands is provided. For example, IBM's VMControl has a specific grammatical construct for expressing that two Virtual Machines cannot reside on the same physical machine. IBM's Tivoli System Automation Availability Manager has another grammatical construct for expressing that two applications cannot reside on the same Virtual Machine. A given Resilience Tier that requires any such kind of separation would have to express it in an appropriate grammatical construct. In this regard, disclosed herein is the concept of automatically transforming the spatial and behavioral compositions associated with a selected Resilience Tier into the grammatical construct that is consumable by the component availability managers.

Automatic Initialization and Configuration of Multiple Availability Managers. Given a Resilience Tier, a set of spatial and behavioral composition goals, and a set of customized rules for achieving those goals expressed in the grammatical construct that the constituent availability managers can understand, what is also disclosed is the process of automatically utilizing the rules expressed in the availability manager grammatical constructs to initialize, configure, and start the constituent availability managers so as to realize the objectives of the selected Resilience Tier. In one example, this initialization and configuration would be performed by a Resilience Framework Orchestrator (as described herein).

Automatically Orchestrating (e.g., at run time) Any Needed Interactions Between the Component Availability Managers to Ensure That They Interoperate Smoothly and Properly. Once a system comprising multiple availability managers is up and running according to the initialization and configuration process described herein, it may be necessary for the Resilience Framework Orchestrator to intervene during fault handling behavior (or at other times) to exert real-time control on one or more availability managers. For example, in a system being managed by both a black box availability manager and a white box availability manager, the Resilience Framework Orchestrator may have to prevent the white box availability manager from interpreting certain run time actions of the white box availability manager as a failure (such as an active migration that might temporarily interrupt the heartbeat of the white box availability manager and hence cause a gratuitous response by the white box availability manager). To handle all such conditions, disclosed herein is the process of identifying and automatically orchestrating any needed interactions between the component availability managers to ensure that they interoperate smoothly and properly at run time to meet the requirements of the selected Resilience Tier.

In one embodiment, a computer-implemented system for configuring at least a first availability manager and a second availability manager is provided, comprising: a user interface, wherein the user interface receives from a user an availability management goal associated with at least: (a) the first availability manager, and (b) the second availability manager; a processing element in operative communication with the user interface, wherein the processing element determines, based at least in part upon the availability management goal: (a) at least one setting associated with the first availability manager, and (b) at least one setting associated with the second availability manager; and a control element in operative communication with: (a) the processing element, (b) the first availability manager, and (c) the second availability manager; wherein the control element receives from the processing element the at least one setting associated with the first availability manager and provides to the first availability manager the associated setting; and wherein the control element receives from the processing element the at least one setting associated with the second availability manager and provides to the second availability manager the associated setting.

In one example, the first availability manager may comprise a white box availability manager and the second availability manager may comprise a black box availability manager.

In another example, the user interface may receive the availability management goal from the user via a network.

In another example, the availability management goal may comprise one value from a predetermined set of quantized values.

In another example, the predetermined set of quantized values may be provided to the user via the user interface.

In another example, the user interface may be configured to receive from the user a selection of one value from the set of predetermined quantized values.

In another example, the processing element may determine, based at least in part upon the availability management goal, a spatial composition associated with the first availability manager and the second availability manager; the spatial composition may be reflected in the at least one setting associated with the first availability manager that is determined by the processing element; and the spatial composition may be reflected in the at least one setting associated with the second availability manager that is determined by the processing element.

In another example, the processing element may determine, based at least in part upon the availability management goal: (a) a behavioral composition associated with the first availability manager, and (b) a behavioral composition associated with the second availability manager; the behavioral composition associated with the first availability manager may be reflected in the at least one setting associated with the first availability manager that is determined by the processing element; and the behavioral composition associated with the second availability manager may be reflected in the at least one setting associated with the second availability manager that is determined by the processing element.

In another example, the processing element may determine, based at least in part upon the availability management goal: a spatial composition associated with the first availability manager and the second availability manager; the processing element may determine, based at least in part upon the availability management goal: (a) a behavioral composition associated with the first availability manager, and (b) a behavioral composition associated with the second availability manager; the processing element may determine, based at least in part upon the spatial composition and the behavioral composition associated with the first availability manager, a grammatical construct for expressing the spatial composition and the behavioral composition associated with the first availability manager to the first availability manager; and the processing element may determine, based at least in part upon the spatial composition and the behavioral composition associated with the second availability manager, a grammatical construct for expressing the spatial composition and the behavioral composition associated with the second availability manager to the second availability manager.

In another example, the grammatical construct for expressing the spatial composition and the behavioral composition associated with the first availability manager may be reflected in the at least one setting associated with the first availability manager that is determined by the processing element; and the grammatical construct for expressing the spatial composition and the behavioral composition associated with the second availability manager may be reflected in the at least one setting associated with the second availability manager that is determined by the processing element.

In another example, the configuring may include controlling the failure handling and other behavior of at least one of: (a) the first availability manager while the first availability manager is in a post-initialized state, and (b) the second availability manager while the second availability manager is in a post-initialized state.

In another example, the configuring may include controlling the failure handling and other behavior, in real time, of at least one of: (a) the first availability manager, and (b) the second availability manager.

In another example, the configuring may include initializing at least one of: (a) the first availability manager while the first availability manager is in a pre-initialized state, and (b) the second availability manager while the second availability manager is in a pre-initialized state.

In another embodiment, a method implemented in a computer system for configuring at least a first availability manager and a second availability manager is provided, comprising: providing a user interface, wherein the user interface receives from a user an availability management goal associated with at least: (a) the first availability manager, and (b) the second availability manager; determining, based at least in part upon the availability management goal: (a) at least one setting associated with the first availability manager, and (b) at least one setting associated with the second availability manager; providing the at least one setting associated with the first availability manager to the first availability manager; providing the at least one setting associated with the second availability manager to the second availability manager; and running a program using a processor unit to execute one or more of said steps of: (a) providing a user interface; (b) determining; (c) providing the at least one setting associated with the first availability manager to the first availability manager; and (d) providing the at least one setting associated with the second availability manager to the second availability manager.

In one example, the steps may be carried out in the order recited.

In another example, the first availability manager may comprise a white box availability manager and the second availability manager may comprise a black box availability manager.

In another example, the configuring may include controlling the failure handling and other behavior of at least one of: (a) the first availability manager while the first availability manager is in a post-initialized state, and (b) the second availability manager while the second availability manager is in a post-initialized state.

In another example, the configuring may include controlling the failure handling and other behavior, in real time, of at least one of: (a) the first availability manager, and (b) the second availability manager.

In another example, the configuring may include initializing at least one of: (a) the first availability manager while the first availability manager is in a pre-initialized state, and (b) the second availability manager while the second availability manager is in a pre-initialized state.

In another embodiment, a program storage device readable by machine, tangibly embodying a program of instructions executable by the machine to perform a method for configuring at least a first availability manager and a second availability manager is provided, said method comprising: providing a user interface, wherein the user interface receives from a user an availability management goal associated with at least: (a) the first availability manager, and (b) the second availability manager; determining, based at least in part upon the availability management goal: (a) at least one setting associated with the first availability manager, and (b) at least one setting associated with the second availability manager; providing the at least one setting associated with the first availability manager to the first availability manager; providing the at least one setting associated with the second availability manager to the second availability manager; and running a program using a processor unit to execute one or more of said steps of: (a) providing a user interface; (b) determining; (c) providing the at least one setting associated with the first availability manager to the first availability manager; and (d) providing the at least one setting associated with the second availability manager to the second availability manager.

In one example, the steps may be carried out in the order recited.

In another example, the first availability manager may comprise a white box availability manager and the second availability manager may comprise a black box availability manager.

In another example, the configuring may include controlling the failure handling and other behavior of at least one of: (a) the first availability manager while the first availability manager is in a post-initialized state, and (b) the second availability manager while the second availability manager is in a post-initialized state.

In another example, the configuring may include controlling the failure handling and other behavior, in real time, of at least one of: (a) the first availability manager, and (b) the second availability manager.

In another example, the configuring may include initializing at least one of: (a) the first availability manager while the first availability manager is in a pre-initialized state, and (b)

the second availability manager while the second availability manager is in a pre-initialized state.

In another embodiment, a system for configuring at least a first availability manager and a second availability manager is provided, the system comprising one or more processor units configured for: providing a user interface, wherein the user interface receives from a user an availability management goal associated with at least: (a) the first availability manager, and (b) the second availability manager; determining, based at least in part upon the availability management goal: (a) at least one setting associated with the first availability manager, and (b) at least one setting associated with the second availability manager; providing the at least one setting associated with the first availability manager to the first availability manager; providing the at least one setting associated with the second availability manager to the second availability manager; and running a program using a processor unit to execute one or more of said steps of: (a) providing a user interface; (b) determining; (c) providing the at least one setting associated with the first availability manager to the first availability manager; and (d) providing the at least one setting associated with the second availability manager to the second availability manager.

In another embodiment, an article of manufacture is provided, comprising: at least one tangible computer readable device having a computer readable program code logic tangibly embodied therein to execute at least one machine instruction in at least one processing unit for configuring at least a first availability manager and a second availability manager, said computer readable program code logic, when executing, performing the following steps: providing a user interface, wherein the user interface receives from a user an availability management goal associated with at least: (a) the first availability manager, and (b) the second availability manager; determining, based at least in part upon the availability management goal: (a) at least one setting associated with the first availability manager, and (b) at least one setting associated with the second availability manager; providing the at least one setting associated with the first availability manager to the first availability manager; providing the at least one setting associated with the second availability manager to the second availability manager; and running a program using a processor unit to execute one or more of said steps of: (a) providing a user interface; (b) determining; (c) providing the at least one setting associated with the first availability manager to the first availability manager; and (d) providing the at least one setting associated with the second availability manager to the second availability manager.

As described herein, various principles of a resilience framework that allow a customer to specify, deploy, manage, and analyze the resilience of a complex IT system in a consumable way is described. Also described are various customer needs, and the principles of the resilience framework intended to meet those needs. These principles may include one or more of the following:

Definition of meaningful Resilience Tiers that abstract away complexity;

A clear association of Resilience Tiers to customer value metrics;

Composition and coordination of the actions of the multiple availability management components that are inevitable in a real IT system; and Constraining the behavior of such availability managers to limit the typically exponential behavioral complexity of composed structures, and make behavioral composition feasible at all.

Further, the use of some of these principles to specify, deploy, and manage the availability of an IT structure containing (for example) x86 servers, the Xen hypervisor, SLES virtual machines, application resources using Tivoli System Automation as the application-level availability manager, and a simplified interpretation of VMControl as the virtual machine-level availability manager is demonstrated.

Further, the use of analytical techniques to transform the customer's simplified Resilience Tier and desired Figure of Merit ("FOM") within that Resilience Tier into the parameters necessary to inform the deployment of the resilience structure is demonstrated.

Further, a Resource Relationship Modeling Framework that can be a powerful specification and analysis tool for modeling and understanding a wide range of resilience-related behaviors at various points in a system's life cycle is disclosed.

In other embodiments a resilience framework that alleviates some or all of the customer "pain points" discussed herein may be provided. Such embodiments may be provided specifically in support of one or more of the following activities:

Specifying a workload and its resilience requirements Specify a "workload". A workload may consist of a very large number (e.g., tens of thousands) of heterogeneous application and virtual machine images. Because of the scale of the workload, abstractable/hierarchical logical and graphical representations may be needed. Specify the abstract resilience requirements of all or part of a given workload, per a radical simplification schema. Note that not all elements of a given workload need have the same abstract resilience requirement. This may be achieved by defining a small set of availability policies for each resource in a topology, and a consistent mapping (e.g., including behavioral constraints) from a resource to its dependent resources, e.g., from middleware (e.g., DB2, WebSphere, MQ), to OS, to pool, to hardware.

Specifying a hosting environment The hosting environment may represent interdependent (e.g., modeled or instantiated) physical and/or logical resources that may host workloads. The hosting environment may consist of a very large number of heterogeneous physical and/or logical resources, potentially geographically dispersed into a number of "clouds", which may have multiple owners (e.g., internal versus external).

Determining placement of a workload into its environment Calculate a hosting relationship (placement) that maps a workload to a hosting environment such that all constraints and requirements are met. Include workload prediction and advance reservations.

Deploying a workload into its environment Automatically configure and initialize the multiple availability managers in the hosting environment to support the workload's resilience requirements. Deploy a workload onto a hosting environment in the proper sequence and with increased efficiency.

Managing a workload within an environment Allow multiple availability managers to perform their functions on possibly overlapping resources, to the benefit of the customer and with minimal internal change.

Monitoring hosting environment Monitor a hosting environment and clearly determine the impact of faults on related components, and perform continual resilience policy compliance monitoring as the environment changes.

Analyzing a workload relative to a hosting environment
  Develop a resource relationship model that is rich enough to support the resilience topology specification, analysis, and deployment needed. Analyze an existing or modeled hosting relationship to determine whether all constraints and requirements are met. This includes the capability of simulating fluctuations in resource utilizations, failures/errors, etc via dynamic adjustment of any desired resource property. This could include assessing whether a given topology meets a given Resilience Tier, determining what Resilience Tiers a given topology is capable of supporting, simulating the effect of removal (failure) of a resource.

In other embodiments one or more of the following resilience framework principles may be applied:

Resilience Tiers One principle of the resilience framework may be to simplify to the extent possible all aspects of availability management in this environment. Such simplification may start with the abstraction and strict limitation of availability management options presented to the customer. In one example, a set of Resilience Tiers (e.g., "Gold/Silver/Bronze", or "Good/Better/Best"), may be applied to the world of virtual machine availability management (e.g., VMControl).

Clear Association/Mapping of Resilience Tiers to Customer Value Metrics Each Tier may be characterized not only by a name, but also by: (1) its value to the customer, and (2) its cost to the customer, in terms that are relevant to their business. In one example, a set of quantitative Resilience Figures of Merit for each Tier may express the business impact of potential failures, and the cost of that Tier in terms of resources.

Support for Multiple Automated Coordinated Availability Managers To achieve the level of simplification that may be desirable within this framework may entail defining and bundling multiple availability manager functions into rational packages in which they can each execute automatically, testing them, delivering them as an entity, and providing lifecycle entity management.

Constrained Behavior Another principle of the Resilience Framework may be not only to embrace and exploit the automated recovery actions of the various availability management subsystems, but also to judiciously constrain the range of behavior of these subsystems, recognizing that it is this large number of possible behaviors that have traditionally caused them to be so difficult to use in the past. This is particularly important because one of the important functions of the Resilience Framework may be to compose the behaviors from multiple availability managers into a coherent and interacting whole, and this may be made much more difficult if the component behaviors are themselves unconstrained. Therefore, in one example, a clearly defined and limited number of resource-specific recovery actions may be created.

Figure 3:
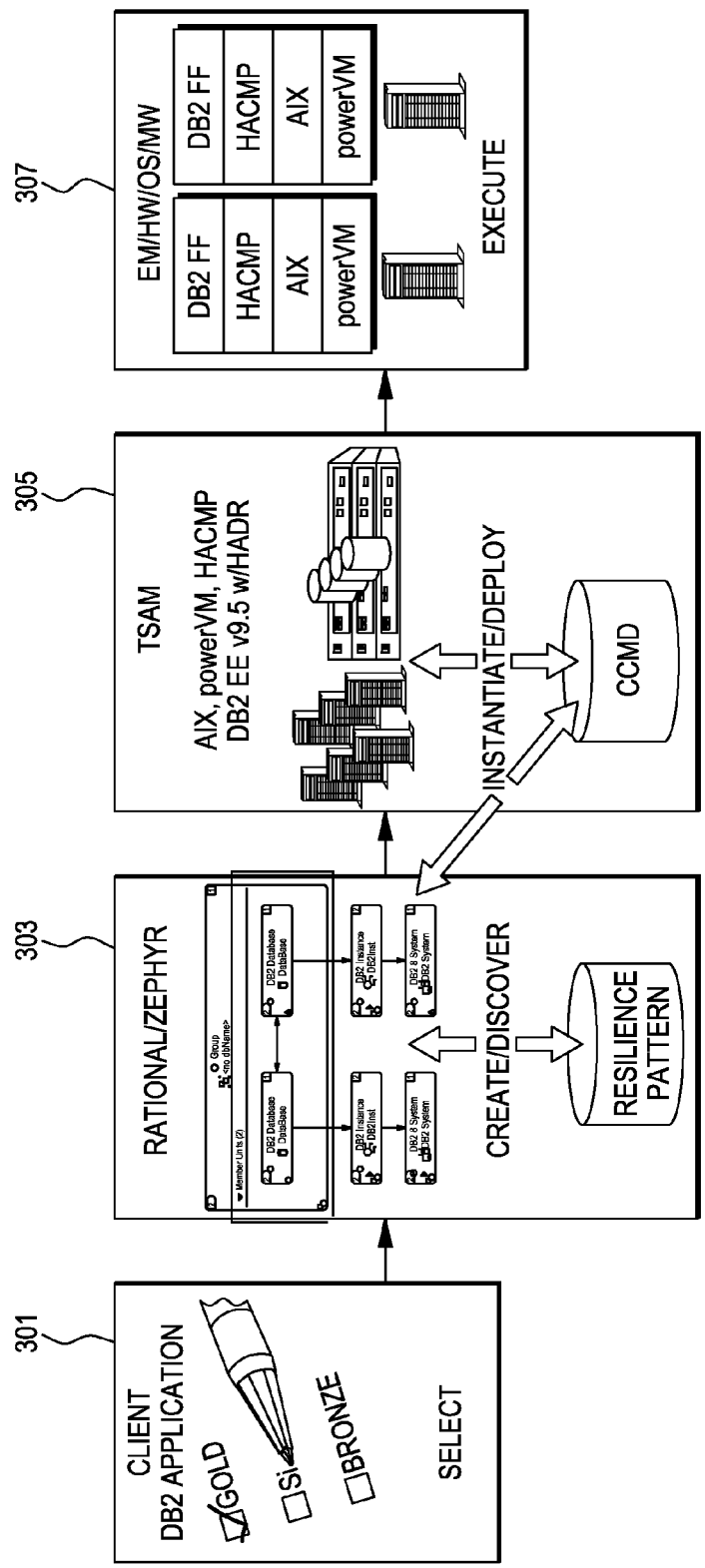
FIG. 3 is a block diagram of a system according to an embodiment of the present invention.

In other embodiments one or more of the following resilience framework elements may be applied (the resilience framework may reside within the context of an overal systems management structure, as illustrated in FIG. 3), that allows the client to:

Select an application and its Resilience Tier (element 301 of FIG. 3). Quantitative Figures of Merit for the application may also be selected.

Based on the Resilience Tier and the Figures of merit, create a Resilience pattern (that can be stored in a library for future reuse) (element 303 of FIG. 3).

Instantiate and deploy the Resilience pattern using a conventional deployment tool such as Rational or TSAM (element 305 of FIG. 3).

Support the runtime management and analysis of the executing Resilience structure (element 307 of FIG. 3).

Reference will now be made to an example workload model according to another embodiment.

In this example workload model, one step in defining and understanding the ramifications of deploying a workload into and configuring complex resilience structures is to clearly specify the characteristics and requirements of the workload itself. Since there is typically no single description possible of the vast range of workloads that need to be supported, in this example, we identify common axes of discrimination into which workloads can be categorized, with which customers can "tag" their workload, and which inform the coherent configuration and operation of resilience services.

In this example, we focus on those axes in particular that inform availability management, recognizing (and ignoring for this example) that factors from other management disciplines, such as performance and security, may strongly interact with availability management For the purposes of this example, a workload consists of one or more "Application Resources", e.g., specific customer-defined tasks some number of which must be available to achieve the customer's business goals. There may be many Application Resources (AR's) in a customer's workload. Each AR is thought of in this example as an atomic manageable application resource, such as a process, container, an HA resource, or process group, whose availability could potentially be managed by a white box availability management (WAM) product such as HACMP, TSA, Veritas Cluster Services, WPAR Manager, LinuxHA, WebSphere CloudBurst, DB2 HA/DR, or Microsoft Clustering Services.

A customer's collection of Application Resources is deployed in this example on an infrastructure consisting of one or more Operating Systems, Hypervisors, and Physical Servers. Because this example focuses on a virtualized environment, it is assumed that the Operating System and any Application Resources and associated availability management that execute within it are encapsulated within a Virtual Machine.

A Service Degradation Event is defined in this example to be any resource outage (e.g., Application Resource, Operating System, Hypervisor, or Physical Server) that reduces the number of Application Resources in operation.

In this example, any workload has intrinsic functional characteristics such as how its components (in this case ARs) work together dependently or independently, how work is distributed among them, and how they must be recovered in the event of failures. A simple taxonomy example is:

Amenable to application-level (i.e., White-Box) availability management<->not amenable to application-level AM
  Independent workload units<->Dependent workload units
  Granularly scalable<->non-scalable
  Gracefully degradable<->not gracefully dependable
  Stateless<->Stateful In one example, the application may be amenable to WAM, consisting of independent workload units, granularly scalable, and gracefully degradable. In one example, no particular assumptions are made relative to the statefulness of the Application Resources, as this may be considered an internal issue for the WAM recovery scripts.

In one example, the customer's workload and its unique resilience figures of merit ("FOM") may determine the minimum-cost (e.g., spatial composition) resource allocation strategy for resilience (e.g., within a resilience tier).

The main FOM considered in this example is a reliability-oriented workload (such as a SOA or e-Commerce workload) in which the predominant concern is to meet a minimum Service Level Agreement at any given point in time. Such workloads typically require that a given minimum number of Application Resources be available at all times in order to provide acceptable throughput, and are impacted by the number of Application Resources that are disabled at any given time by one or more Service Degradation Events (SDE). For such a reliability-oriented workload it is asserted in this example that the FOM to be minimized is the probability that fewer than a given baseline number of Application Resources required to meet an SLA are available at any point in time, and the amount of time that the AR deficit lasts when it does occur.

In one example, this particular FOM may be denoted as: P(SLA Violation). This may be a parameter that is provided by the user to the Resilience Orchestrator to allow the Orchestrator to determine where and how resources should be distributed across the IT system to achieve the Resilience goals.

Other resilience-related figures of merit that may be of interest but that are not calculated explicitly in this example include (but ore not limited to):

A second broad class of workload exemplified by a possibly long-running Grid type of application, in which the expected number of Application Resources available over a time interval is the quantity to be maximized. These workloads are typically not so much concerned with the point impact of any given SDE so much as the total impact of all the SDEs that may occur over a period of time in terms of Application Resources Hours that are made unavailable over that time. This may be considered more of an availability-oriented workload. For such an availability-oriented workload the FOM to be minimized may be the total number of Application Resource Hours lost due to Service Degradation Events, relative to some baseline desired number of Application Resources, over some period of time.

Service Degradation Events per year

Expected Duration of Service Degradation Event

Number of Application Resources Affected Per Service Degradation Event

In various embodiments an analytical framework may be provided that allows the calculation and minimization of additional FOMs as such FOMs are determined to be important.

With reference now to cost figures of merit, in one example, for each workload, Resilience Tier (and resultant mapping), and component costs, it may be possible to count up the number of servers, hypervisor instances, operating system instances, and various licenses needed to implement that Tier. In this regard, however, an element of the cost calculation may be an accurate prediction of the spatial and temporal overheads of executing a particular availability management subsystem. To the extent feasible these costs may be based on quantitative benchmarking.

Reference will now be made to definition of server resilience tiers according to another embodiment of the present invention. In one example, the resilience of servers and their associated software stacks and workloads may be considered, with respect to Unplanned Outages and Planned Outages. Unplanned Outages may include any unpredictable impairments to the dependability of any element in the IT stack. Under the heading of Planned Outages, predicted failures as well as user-initiated outages of selected IT elements for whatever purposes may be included.

In one example, the Resilience Tiers for unplanned and planned outages are uncoupled because it is possible that customers may want have a different level of capability for the two. When the handling of planned outage and unplanned outages was bundled into a single level, there was typically pressure to unbundle the two for added flexibility (as determined in a demonstration). However for conceptual simplicity parallelism may be retained between the Tiers for the two cases in this example.

The term "recover" is used to indicate that a resource's (e.g., VM or higher level element) operation has been restored after the occurrence of a fault. There can be many forms of recovery, ranging from resumption from a boot image, to restarting an application, to resuming from a (micro) checkpoint. The term "evacuate" is used to indicate that a resource (e.g., VM or higher level element) is to be gracefully migrated from a condemned element to an approved element in the IT stack. Modes of evacuation can range from the known active migration capabilities of virtual machines, to a clean shutdown and restart of an affected component.

Various examples related to unplanned outages include the following:

Tier 5—Automated Recovery of Physical Server, Virtual Machine, and Application Resource (including Middleware) faults. Notification to user of event and resolution.

Tier 4—Automated Recovery of Physical Server and Virtual Machine faults. No automated recovery of AR faults. Notification to user of event and resolution.

Tier 3—Some automated recovery procedures, but requires human intervention to recover.

Tier 2—State information available, guided manual procedure to recover.

Tier 1—State information available (potentially manual process), unguided manual procedure to recover.

Tier 0—System down, no idea of state or steps to recover.

Various examples related to planned outages include the following:

Tier 5—Automated evacuation in response to Physical Server, Virtual Machine, and Application Resource (including Middleware) events. Notification to user of event and resolution.

Tier 4—Automated evacuation in response to Physical Server and Virtual Machine events. No automated evacuation in response to AR events. Notification to user of event and resolution.

Tier 3—Some automated evacuation procedures, but requires human intervention.

Tier 2—State information available, guided manual procedure to evacuate.

Tier 1—State information available (potentially manual process), unguided manual procedure to evacuate.

Tier 0—System impaired, no idea of state or steps to evacuate.

Reference will now be made to Automated Intra-Tier Configuration of Resilience Capabilities according to an embodiment of the present invention. In one example, the Resilience Tiers described above may be primarily defined by the capabilities of the software resources and associated management structures comprising those tiers. Within each Tier, the composition and configuration of those resources (including redundancy level, redundancy management policy, location constraints, etc.) may be automatically set based on the user's specification of the desired Resilience FOMs. An example of a simple optimization calculation is described elsewhere herein.

In one example, any such automatically-selected configuration may be overridden by customer input. In this case, it may be the responsibility of the Resilience Auditing capability of the Resilience Framework to quantitatively indicate to the customer the effect of this override.

Reference will now be made to Composition according to an embodiment of the present invention. In one example, getting multiple Availability Managers to work together coherently may be a high-dimensionality problem. The Resilience Framework may accommodate, abstract, and coordinate the composition of managed resources, as well as resource managers. In this example, there may be three key dimensions of composability: vertical versus horizontal composition, spatial composition, and behavioral composition. Among the challenges in defining a useful Resilience Framework with respect to solving the high dimensionality composability problem are to isolate useful axes and motifs from within this space, analyze them, and demonstrate that they can be implemented. Reference will now be made to Vertical, Horizontal, and Hybrid Composition according to an embodiment of the present invention. A complex resilience structure may comprise several availability managers, each operating within its own domain of control.

In some cases, the managed resources of a given AM will be encapsulated within the managed resources of another AM. An example of this is when a WAM such as TSA is running on a cluster that is itself running on a collection of virtual machines managed by a VAM (Black Box Availability Manager). The nontrivial problem of getting the AMs responsible for these nested resources to work together coherently is referred to as vertical composition.

In other cases, there may be disjoint resource groups that are managed by one or more AMs. An example of this is the case in which one collection of servers and application resources reside in one bare metal TSA cluster, and another disjoint but related collection of servers and application resources reside in a bare metal HACMP cluster. The problem of getting the AMs responsible for these disjoint resources to work together coherently is referred to as horizontal composition.

Vertically composed managed resources can also be horizontally composed at some levels. For example, the resources managed by a TSA WAM could reside on one subset of a collection of VMs managed by a VAM, and the resources managed by an HACMP WAM could reside on another subset of that collection of VMs managed by that same VAM. This issue is referred to herein as hybrid composition (in one specific example, a TSA cluster working together with an HACMP cluster, neither of which is managed by a VAM may be considered, or two VAM-managed clusters, say, one on x and one P, that have to work together may be considered).

Reference will now be made to Spatial Composition according to an embodiment of the present invention. Implementation of vertical, horizontal, or hybrid composition structures (e.g., resilient IT structures) requires consideration of how active and inactive (i.e., backup) resources are spatially located, with respect to peer resources and with respect to resources with which they are composed (and/or dependent upon) as described herein. This is referred to as the spatial composition problem and is typically determined by the collection of collocation, anticollocation, affinity, and antiaffinity constraints that different managers may levy. Such requirements influence initial and subsequent placements, failovers, and migrations of application (White Box) resources within virtual machines, Black Box VMs within physical servers, and physical servers within data centers. In a coherent resilience configuration, all such constraints must typically be jointly satisfied at all times.

In one example, automatically determining and implementing the appropriate spatial composition constraints based on Resilience Tier and quantitative specification of a user's Resilience figures of merit may be a key attribute.

Since many management concerns may levy spatial composition constraints it is useful to construct a management domain-neutral taxonomy. An example, hierarchy of resilience-motivated pairwise constraints may be defined as described below (the anti-colocation constraint examples are given for failure only, but there may also be a planned maintenance aspect to collocation):

Site—resources must be in different sites such that designated active or inactive (i.e., backup) resources are not both disabled by a single site failure.

Domain—resources must be in different IT (e.g., fault containment region, SPOF, network, power, storage, management) domains, such that resources are not both disabled by a single IT domain-level failure.

Rack—resources must be in different rack or sub rack infrastructures such that resources are not both disabled by a single rack or sub rack-scale failure.

Server—resources must be in different servers such that resources are not both disabled by a single server hardware failure. This is the typical level of anticollocation expressed in a VAM system.

OS—resources must be in different OSs such that resources are not both disabled by a single OS instance failure. However they may both be disabled by a single physical server failure if Server anticollocation is not asserted and virtualization is utilized.

Container—Resources must be in different containers such that resources are not both disabled by a single container failure. They may however both be disabled by a single OS failure if OS anticollocation is not asserted, and they may both be disabled by a single physical server failure if Server anticollocation is not asserted and virtualization is utilized.

None—There are no anticolloc constraints on the resources.

In another example, two key elements of coordinated availability manager (AM) operation may be to: (1) correctly interpret and convey the spatial composition requirements between availability managers; and (2) accurately transform a given set of spatial composition requirements into a particular availability manager's lingua franca. Because different AMs typically have different placement interfaces, capabilities, and underlying models, no single placement model will typically apply to all availability managers. Therefore it may be important to be able to translate from general notions of placement constraints as outlined below, to the particular placement capabilities of a given AM.

Reference will now be made to Behavioral Composition according to an embodiment of the present invention. In this example, Behavioral Composition refers to the principles by which composed Availability Managers dynamically interoperate in response to faults, over and above the simple but sometimes unavoidable principle of disabling one or more AMs. There may be numerous complicating factors. Composed AM mechanisms may interfere, AM mechanisms may be nonuniform within a given AM and by event type (for example, Web/App/DB Server AM mechanisms may vary within a given Resilience Tier.

In one example, behavioral composition may be primarily determined by the specification of the Resilience Tier, and secondarily determined by settings of detailed configuration parameters (such as heartbeat intervals, checkpointing intervals, and so forth) within the constituent Availability Managers.

One important Resilience Framework principle may be to seek interoperability modes in which no availability manager within a composition needs modification to operate coherently within that composition. Thus, in one example, solutions do not require modification of, say, HACMP, or VMControl. Instead, existing functionality and interfaces are manipulated to achieve coherent interoperability. This may be facilitated by another Resilience Framework principle, which may be to limit the possible behaviors of the constituent Availability Managers to a significantly smaller number than they are capable of.

This constrained composition of multiple managers may be performed by a systems management entity called the Resilience Framework Orchestrator, (see, e.g., FIG. 2) In one example, such a Resilience Framework Orchestrator may provide one or more useful aggregate behaviors.

Reference will now be made to an Architectural Setting according to an embodiment of the present invention. A "Resilience Framework Orchestrator" may consume the simplified resilience settings from a user interface and then orchestrate the deployment and configuration of White- and Black-box Availability Managers. FIG. 2 shows one example of where this functionality may reside. In one specific example, a "Resilience Framework Orchestrator" may be productized as a component of an existing systems management product such as IBM Systems Director, a Tivoli product such as TSAM, or both.

In one example, it may be desirable for the Resilience Framework Orchestrator to not have a runtime role in orchestrating responses to failures (in this example, this function may be the province of the individual Availability Managers, which may go about their business not knowing that they are part of a larger Resilience Management Structure). In another example, the Resilience Framework Orchestrator may have a runtime role in orchestrating responses to failures.

Reference will now be made to Geographically-Dispersed Disaster-Resilience according to an embodiment of the present invention.

In various examples, the Resilience Framework is also intended to describe IT structures that have the capability of being geographically dispersed and tolerating planned and/or unplanned site-level outages, as described by the site-level spatial composition terminology.

Figure 4:
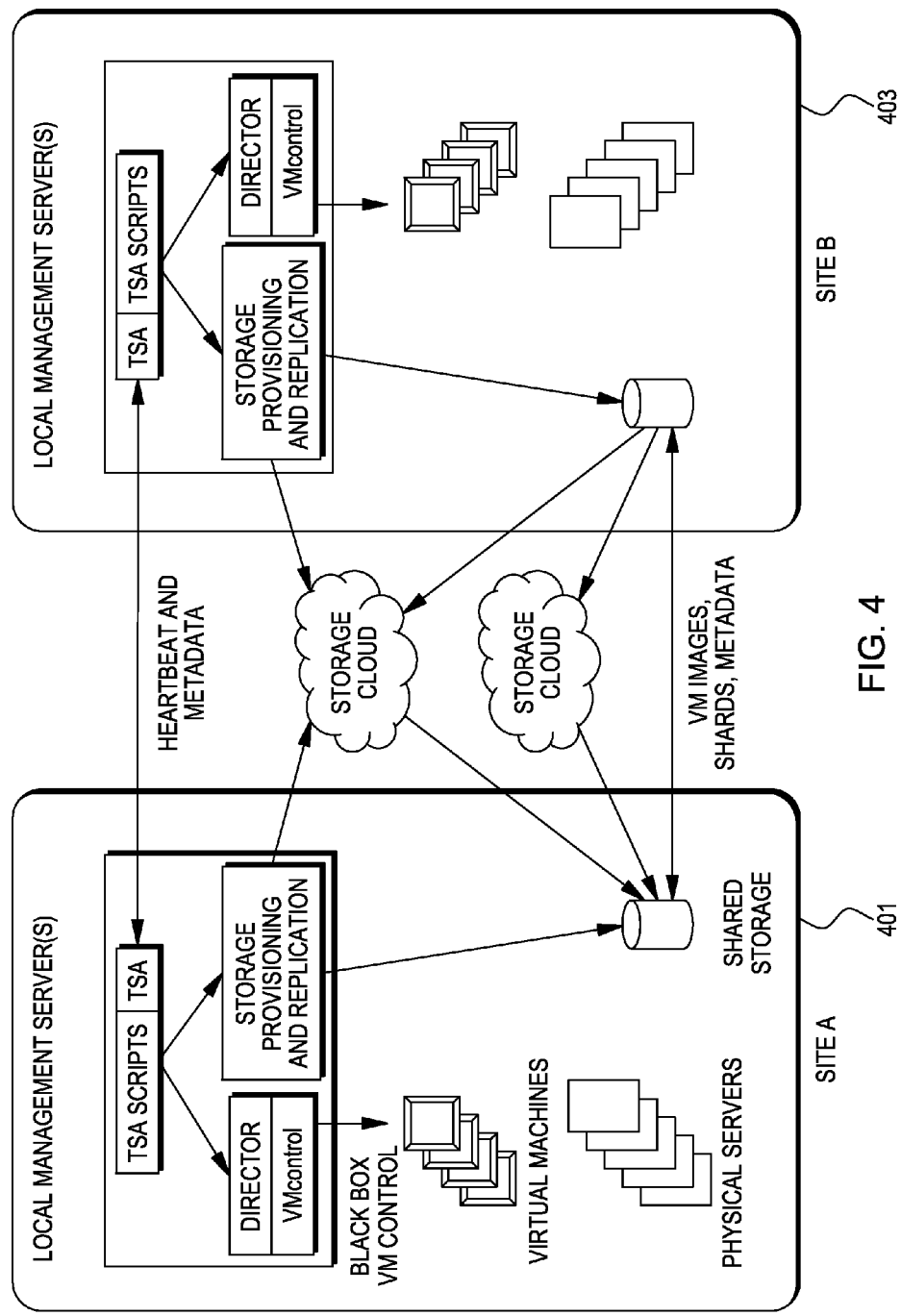
FIG. 4 is a block diagram of a system according to an embodiment of the present invention.

FIG. 4 shows an example of a geographically dispersed Disaster-Resilient configuration comprising Site A (block diagram element 401) and Site B (block diagram element 403), that utilizes IBM's systems management products. Each site contains physical server resources capable of supporting the Application and Virtual resources of a workload. This configuration can be viewed of as running in active-active or active-passive mode. This example will relate to a configuration that supports an active-passive model.

In this example, the responsibility for determining that a site is impaired and workload needs to be recovered on or otherwise migrated to another site (either as a result of a whole-site failure, a whole-site planned outage, or a partial site failure) belongs to the Tivoli Systems Automation (TSA) product. TSA contains at least one instance on a server (or VM) in each geographically distributed site. It performs cross-site heartbeating and exchange of certain metadata, monitors the site in which it is resident, and orchestrates the teardown of resources on a primary site and bringup of resources on a secondary site.

In this example, detailed monitoring and manipulation (including Availability Management) of Black Box VMs within a site is the responsibility of the VMControl function of IBM System Director. At least one instance of ISD/VMC resides on each site for this purpose. TSA contains scripting that is responsible for bringing up virtual machines on a given pool of hardware via invoking the VMControl REST APIs. This scripting could be extended if appropriate to coherently deploy and configure White Box Availability Managers as well using the Resilience Framework Orchestrator, in accordance with the principles described herein.

In this example, the scripting is also responsible for configuring the shared storage needed for the Virtual Machines. This consists of ensuring the replication of VM metadata (OVF files, etc.) and other metadata from the primary site to a place whence the secondary site can access this data and perform VM recovery. This can be accomplished either via utilizing conventional replication features of the shared storage (e.g., PPRC in high end storage systems), or utilization of more advanced Cloud-base storage schemes.

Figure 5:
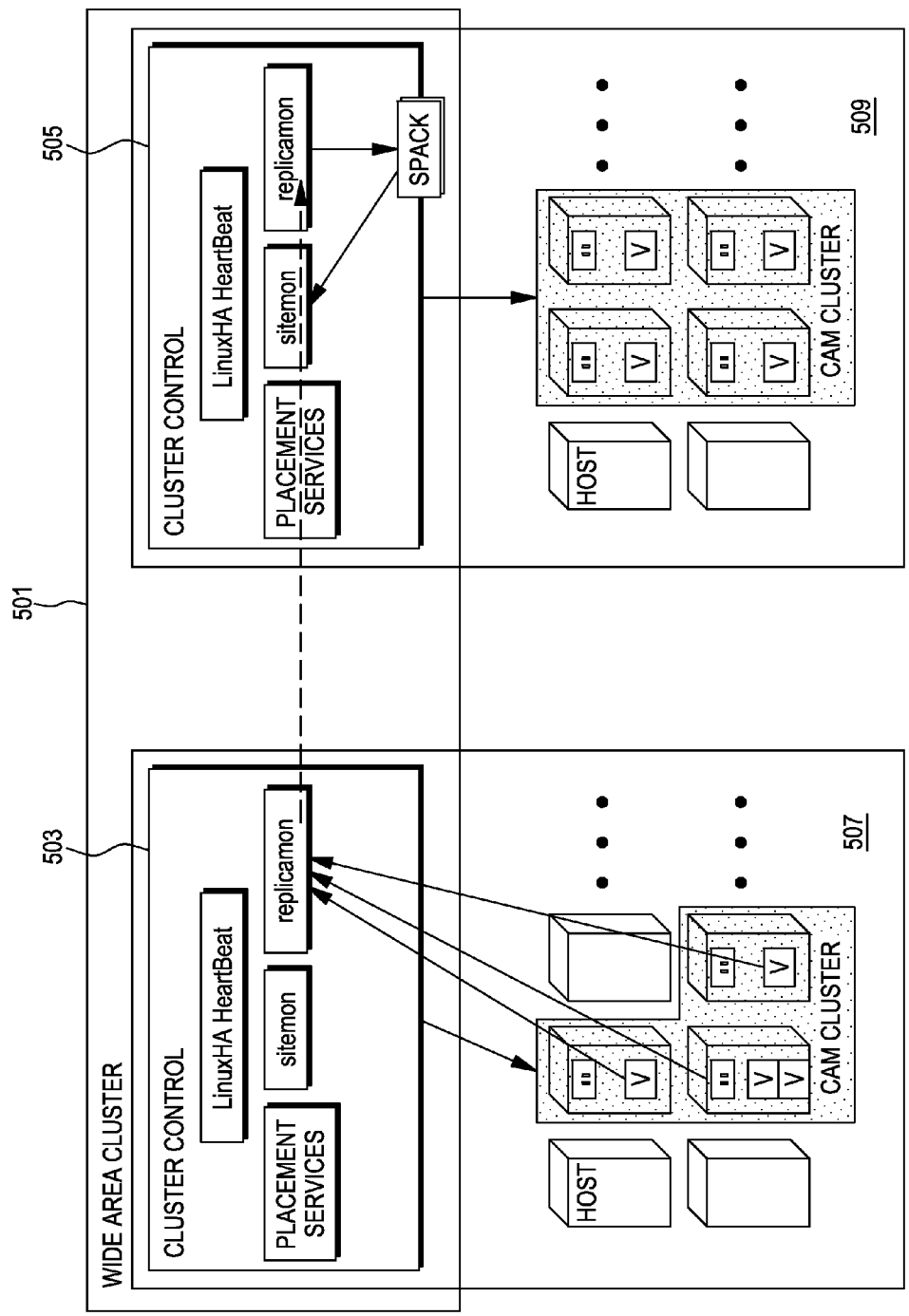
FIG. 5 is a block diagram of a system according to an embodiment of the present invention.

Reference will now be made to Disaster Tolerance using Virtualization according to an embodiment of the present invention (see, FIG. 5).

A demonstration has prototyped the capability to detect and orchestrate a smallish site-scale failover of a collection of virtual machines to a backup site. This project demonstrated several (but not necessarily all of the means of the fundamental principles of a Disaster Recovery (DR) solution).

In this example two collections of x86 servers (analogous to sites) were created, each capable of running the CAM (Continuous Availability Manager) product (see elements 507 and 509). (This CAM product was released in 2007 as part of the Director Virtual Systems Management product.) The two sites were monitored (see elements 501—wide area cluster; 503—cluster control; and 505—cluster control) by the open source LinuxHA product. Several LinuxHA scripts were written to orchestrate site monitoring, data replication, and site failover. The "sitemon" script was written to determine whether the CAM cluster is operational or not, and to bring up the CAM cluster on another site using the private CAM command line APIs (equivalent to the eventual VMC REST APIs). A "replicamon" script was implemented that was responsible for copying a VM image to the secondary site whenever a new VM was added into the CAM cluster, and for ensuring that a record that this VM needed to be restarted was copied to the secondary site. At the time of site failover, this information was fed into the research version of Virtual Resource Placement Services to determine where to place the VMs on the secondary site (it was not assumed that the primary and secondary site were identical). Based on the recommended placement, the sitemon script deployed and started the VMs on the physical servers on the secondary site.

In this example, there was no run-time replication of the VM's image and data from the primary site to the secondary site. As mentioned above, the image and data were replicated only when the VM was instantiated on the primary site. More frequent updating of the secondary site's image and application data is a capability that may be applied for a usable DR solution, and (in one example) may leverage IBM's data geo-replication products and research activities.

In this example, instantiation of the VMs on the secondary site was performed using the private CAM command line API. In another example, instantiation of the VMs on the secondary site may be performed using the VMControl REST API.

In this example, the LinuxHA clustering product was used. In another example, the IBM TSA product may be used.

Reference will now be made to Vertically Composed White Box and Black Box Availability Management according to an embodiment of the present invention. In a demonstration, regarding the feasibility of White Box and Black Box Availability Managers working together, according to the Resilience Framework principles and selected Resilience Tiers, deployment and fault handling using two vertically composed Availability Managers under two Resilience Tiers by automatically creating and executing scripts that configured the Availability Managers based on the Resilience Tier was done.

With regard to Vertically Composed Availability Managers, in this example a simple Virtual Machine Availability Manager that was modeled on the VMControl product was implemented. This software has the capability to detect that a physical server or VM has failed, and respond to that failure either by notifying the user, or restarting the affected VMs either locally, in the case of an isolated VM failure, or on another physical server, in the case of a physical server failure. This simple VAM was implemented using scripting and is capable of managing the availability of Xen VMs on x86 hardware. In this example, the SLES 10 operating system was used within the VMs.

In this example, the White Box Availability Manager was implemented within the Xen VMs using the Tivoli Systems Automation product. This product has the capability of monitoring the health of user-defined application resources such as processes and other user-level objects, and either restarting them (using their resource-specific recovery scripts) or ignoring the failure, depending on the Resilience Tier. If enabled, resource recovery is performed either locally in the event of an isolated resource failure, or on another OS instance in the event of an OS or server failure. In another example, more sophisticated White Box behavior based on HACMP (or PowerHA) and WebSphere may be applied.

With regard to Spatial Composition and Controls, in this example spatial composition refers to how managed resources are placed into their containing resources. Note that spatial composition may need to be considered to some extent at almost any Resilience Tier.

In this example, there are two sets of managed resources: Application Resources and Virtual Machines. Application Resource placement is implemented (in this example) using TSA, and VM placement is managed (in this example) using VMControl.

With regard to Dispersion, for the purposes of this disclosure a shorthand notation is adapted for the degree to which resources are dispersed across their containing resources in a vertical composition structure.

More particularly, a real-valued "Application Resource Dispersion" is defined that determines how those ARs are distributed across Virtual Machines. An AR_Dispersion of 0 implies that the ARs are all placed on one VM, and AR_Dispersion of 1 implies that each AR is placed on a different VM. Intermediate values imply commensurately intermediate degrees of dispersion. In this example demonstration, only a small number of AR_Dispersion factors were realizable because limited disk space on the x86 servers limited the number of VM images (3) that could be instantiated.

Similarly a real-valued "Virtual Machine Dispersion" is defined that determines how the VMs are distributed across Physical Machines. A VM_Dispersion of 0 implies that the VMs are all placed on one Physical Machine, and a VM_Dispersion of 1 implies that each VM is placed on a different Physical Machine. In this example demonstration, only a small number of VM_Dispersions (0 and 1) were achievable since the demonstration only had four physical machines.

Figure 6A:
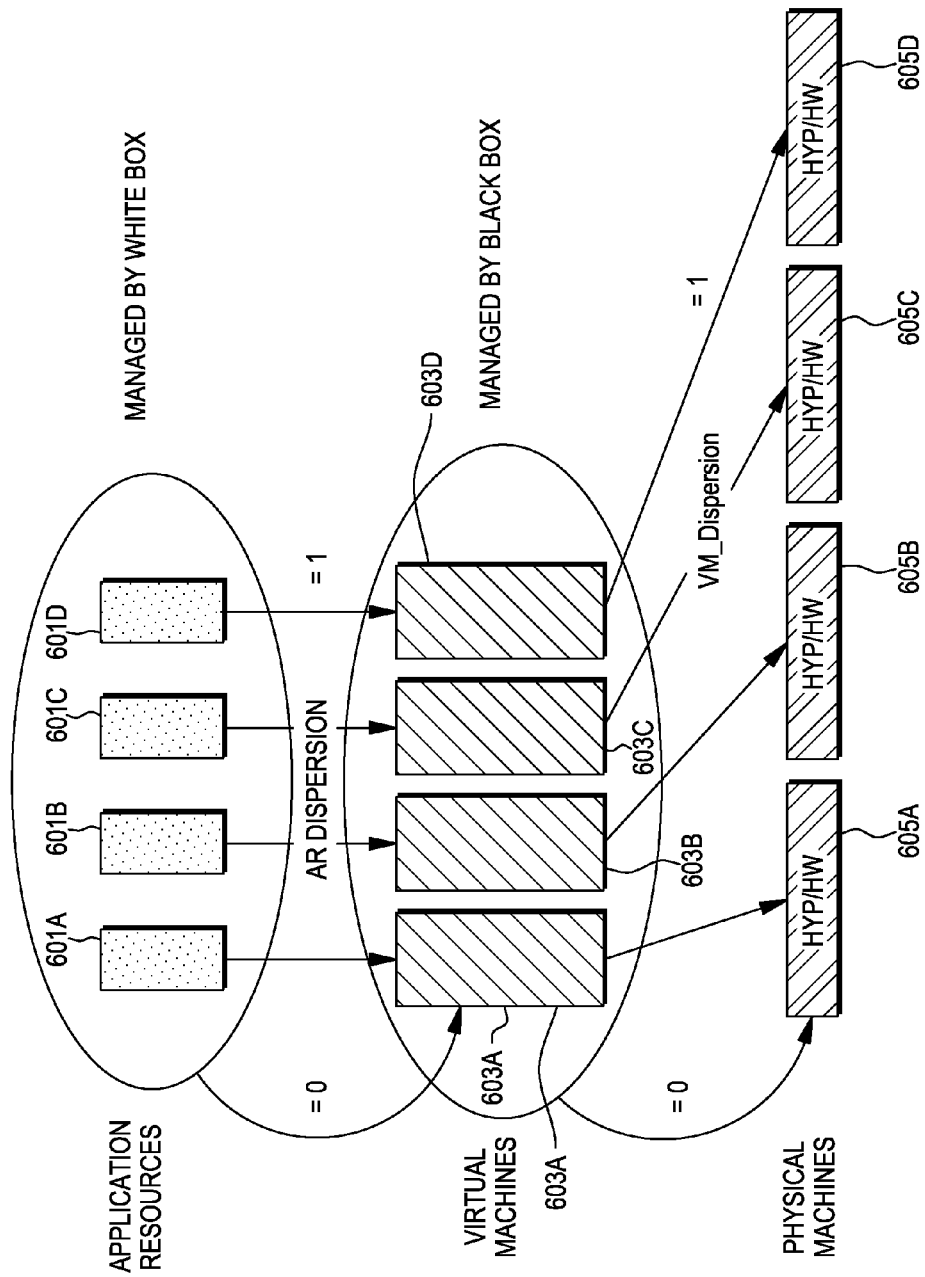
FIG. 6A is a block diagram of a system according to an embodiment of the present invention.

The effect of these dispersions is shown in the example of FIG. 6A, in which Application Resources 601A-601D, Virtual Machines 603A-603D, and Physical Servers 605A-605D are vertically composed.

The demonstration of this example supports AR_Dispersions of 0 and 1. An AR_Dispersion of 0 implies that all Application Resources can be placed into a single OS image, and an AR_Dispersion of 1 implies that no two Application Resources should be placed into the same OS image.

In this example, each Tier may be augmented with the following factors, each of which may strongly influence the Resilience Figures of Merit within a Tier, and which may be automatically determined based on the customer's resilience requirements:

The number of additional Application Resources above and beyond the workload's requirement.

A real-valued "Application Resource Dispersion" that determines how those ARs are distributed across Virtual Machines. An AR_Dispersion of 0 implies that the ARs are all placed on one VM, and an AR_Dispersion of 1 implies that each AR is placed on a different VM. Intermediate values imply commensurately intermediate degrees of dispersion.

A real-valued "Virtual Machine Dispersion" that determines how the VMs are distributed across Physical Machines. A VM_Dispersion of 0 implies that the VMs are all placed on one Physical Machine, and a VM_Dispersion of 1 implies that each VM is placed on a different Physical Machine.

Reference will now be made to an interpretation and implementation of White Box spatial composition according to an embodiment of the present invention.

In the TSA, specification of OS-level AntiCollocation constraints for the Application Resources is performed using the mkrel command in the script that creates the resources (although mkrel can be performed at any time after the resource has been defined). In one example, the Resilience Framework Orchestrator automatically generates the TSA relationships based on the Resilience Tier and the AR_Dispersion and inserts them into the resource creation script. If the AR_Dispersion is equal to 0, then no AntiCollocation constraints are needed. The following automatically generated script segment describes a collection of three AntiCollocated (e.g., AR_Dispersion=1) Application resources, "wally", "betty" and "elizabeth".

---

...
mkrel -p AntiAffinity -S IBM.Application:betty -G IBM.Application:wally betty_anticolloc_wally
mkrel -p AntiAffinity -S IBM.Application:elizabeth -G IBM.Application:wally elizabeth_anticolloc_wally
mkrel -p AntiAffinity -S IBM.Application:wally -G IBM.Application:betty wally_anticolloc_betty
mkrel -p AntiAffinity -S IBM.Application:elizabeth -G IBM.Application:betty elizabeth_anticolloc_betty
mkrel -p AntiAffinity -S IBM.Application:wally -G IBM.Application:elizabeth wally_anticolloc_elizabeth
mkrel -p AntiAffinity -S IBM.Application:betty -G IBM.Application:elizabeth betty_anticolloc_Elizabeth
...

---

Note that in this limited-resource demo, AntiAffinity constraints are used instead of AntiCollocation constraints. This allows TSA to distribute resources across OSes when enough are available to support full anticollocation, but to collocate resources in the event of OS failures that reduce the number of OSes to fewer than the number of resources, thus keeping all resources online albeit in an undesirable collocated state.

TSA redistributes the resources when sufficient OS images are online to support full anticollocation.

Reference will now be made to an interpretation and implementation of Black Box spatial composition according to an embodiment of the present invention.

In the Virtual Machine Availability Manager, Server-level AntiCollocations are specified using the Virtual Resource Placement Services Advice (VRPS) interface. Based on the VM_Dispersion factor, these AntiCollocation advices are dynamically created and fed into VRPS prior to requesting a VM placement.

The following XML example snippet illustrates the syntax of the VRPS Coalesced Advice that indicates that VM websrv2 and websrv3 cannot be located on the same physical machine. When VM_Dispersion is equal to one, similar pair wise AntiCollocations are set up for all VMs in this example. Note that these constraints are maintained and enforced when VRPS is asked to compute a re-placement when a server fails or is taken out of service.

```
. . .
<VirtualEntityCollocationAdvices>
  <VirtualEntityCollocationAdvice>
    <AdviceID>4</AdviceID>
    <AdvisorID>AVAILABILITY_ADVISORID</AdvisorID>
    <MayNotCollocateAdvice AdviceRigor="REQUIRE"
Reason="Resilience Framework Anticollocation">
      <VirtualEntities>
        <VirtualEntity>
          <IDType>VM ID</IDType>
          <Value>websrv2</Value>
        </VirtualEntity>
        <VirtualEntity>
          <IDType>VM ID</IDType>
          <Value>websrv3</Value>
        </VirtualEntity>
      </VirtualEntities>
    </MayNotCollocateAdvice>
  </VirtualEntityCollocationAdvice>
. . .
```

Reference will now be made to Behavioral Composition Controls according to an embodiment of the present invention.

In this example, the selected Resilience Tier primarily influences the behavioral composition of the Availability Managers. The behaviors of the various Availability Managers were not modified in any of the compositions created within this demonstration of the Resilience Framework.

In this example, when Resilience Tier 5 is selected, both the VAM and the WAM are activated and capable of responding to failures. Note (in this example) that VM AntiCollocation constraints must be made consistent with AR AntiAffinity constraints both at initial deployment, and after fault recovery. This is a responsibility of the Resilience Framework since neither WAM nor VAM are typically aware of each other The following Table 1 shows the actions performed under the failure modes that have been demonstrated in this example (Resilience Tier 5). Note that the generic term "recover" refers to restarting the Application Resource or VM in this demo, but in more sophisticated VAM and WAM policies it could represent more sophisticated recovery mechanisms such as "recover from checkpoint."

TABLE 1

Actions Performed

| | VAM | WAM | Notes |
|---|---|---|---|
| Application Resource Failure | No Action | Recover AR on same VM. | |
| Virtual Machine Failure | Recover VM on same Physical Server. | Recover affected ARs on another VM. When "home" VM recovers, rebalance ARs to maintain AntiAffinity constraints if necessary. | Ensure that VM recovery honors AR's AntiAffinity constraints. Race condition between VM restart and AR restart. Currently, AR restart occurs first. |
| Permanent Physical Server Failure | Recover affected VMs on different Physical Servers. | Recover affected ARs on another VM. When "home" VMs recover, rebalance ARs to maintain AntiAffinity constraints if necessary. | Ensure that VM recovery honors VM's AntiColloc constraints. Race condition between VM restart and AR restart. Currently, AR restart occurs first. |

When Resilience Tier 4 is activated in this example, the VAM is activated but the WAM is deactivated. This corresponds to the level of availability management that is typically provided by conventional Black Box virtual machine availability managers. The following Table 2 shows the fault handling behavior of this Tier for this example (Resilience Tier 4).

TABLE 2

Actions Performed

| | VAM | WAM | Notes |
|---|---|---|---|
| Application Resource Failure | No Action | No Action | Presume human intervention. |
| Virtual Machine Failure | Recover VM on same Physical Server. | No Action | If AR is in OS init table, then it will restart when the OS restarts. |
| Permanent Physical Server Failure | Recover affected VMs on different Physical Servers. | No Action | If AR is in OS init table, then it will restart when the OS restarts. |

In another example of behavioral composition:
White Box
  If Resilience Tier 5 is requested, then full TSA automation (resulting in White Box Availability Management) is automatically enabled by the Resilience Orchestrator using the TSA samctrl-M F command. If Resilience Tier 4 is requested, then TSA automation is automatically disabled by the Resilience Orchestrator using the TSA samctrl-M T command.
Black Box
  Black Box Availability Management is enabled in both Tiers 4 and 5. When Black Box Availability Management is to be disabled for lower Resilience Tiers, it is performed using the API that is appropriate for the selected Black Box Availability Manager.
For example, if the IBM VMControl product is used, then it may be configured to respond or not to relevant failures via its externally published REST API—http://publib.boulder.ibm.com/infocenter/director/sdk/index.jsp?topic=/com.ibm.vmcontrol.ws.doc/html/vmc2_2_api_sdk.html (the entire contents of which is incorporated by reference herein).

Figure 6B:
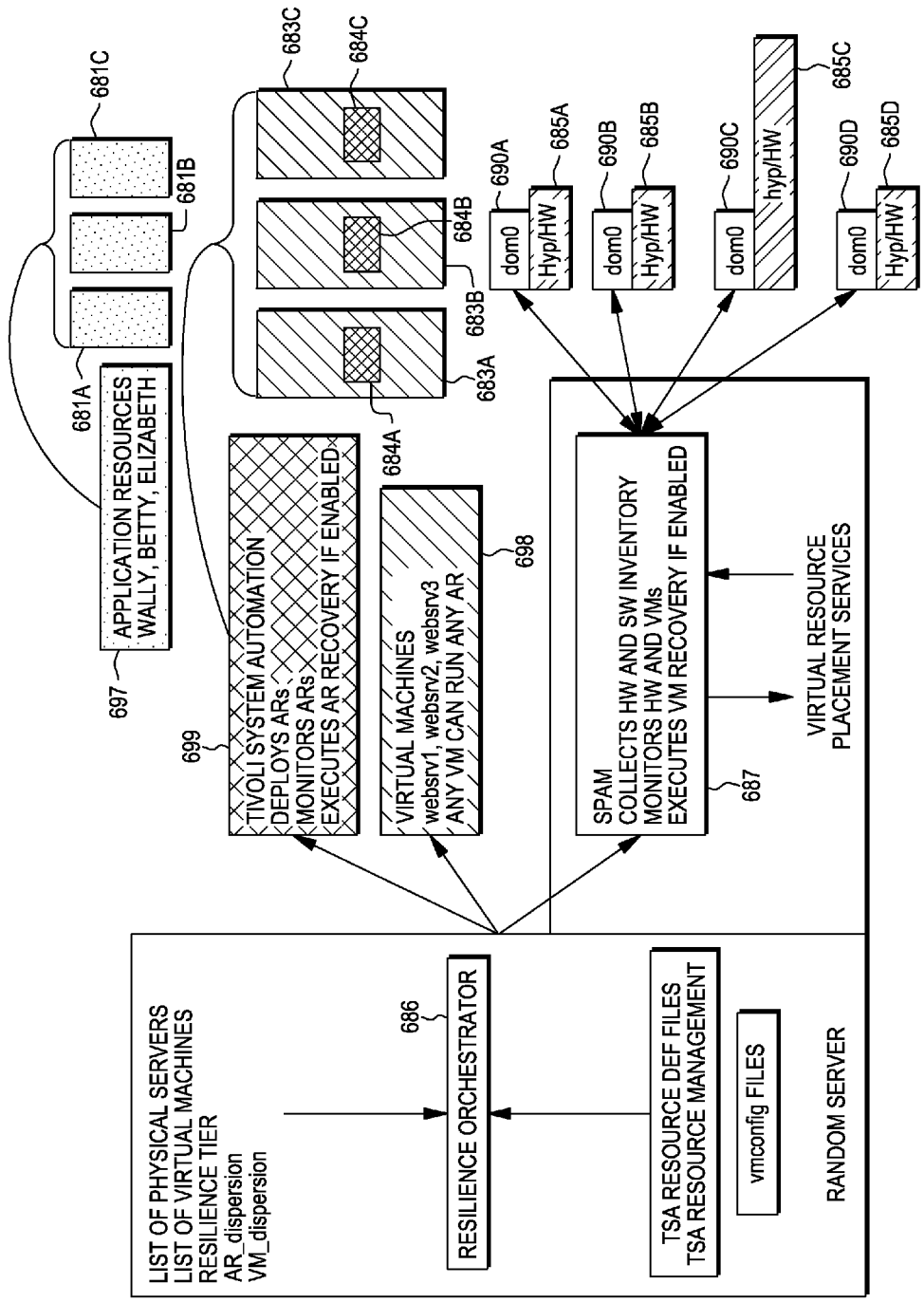
FIG. 6B is a block diagram of a system according to an embodiment of the present invention.

Reference will now be made to a Demo Structure according to an embodiment of the present invention (see FIG. 6B).

With regard to the Managed Environment of this example, boxes 685A, 685B, 685C and 685D represent the collection of x86 physical servers that were used to host the VMs and the ARs. This heterogeneous ensemble of servers is variously running the Xen hypervisor with SLES 10 or SLES 11 running in dom0 (see boxes 690A, 690B, 690C and 690D), Red Hat bare metal, Windows bare metal, and Windows Hyper-V. No shared storage was available so all VM images were placed directly on the local storage of the physical servers. Also, no Virtual Availability Management agent code per-se was placed into dom0—in this demonstration all VM and server fault detection was implemented via ssh monitoring external to the managed systems.

All VMs (boxes 683A, 683B, 683C) were based on SLES 10 and compatible only with the SLES 10-based hypervisors in this example ensemble. Consequently the server's architectural capabilities were detected and the architectural compatibility constraints capability in the Virtual Resource Placement Services were exercised to prevent incompatible placements. This is automatically determined by examining a VM's vmconfig file, comparing its contents to the harvested Physical Server's OS parameters, and setting up the VRPS constraint file appropriately.

Each VM of this example had Tivoli System Automation (boxes 684A, 684B, 684C) pre-installed (although, in another example, the Resilience Orchestrator (box 686) could have installed it at deployment time). Furthermore, each VM was configured such that it was capable of running any or all Application Resources (boxes 681A, 681B, 681C). Note that each VM/Tivoli System Automation combination 683A/684A, 683B/684B, 683C/684C, is of the type shown at boxes 699/698. Further, note that each Application Resource 681A, 681B, 681C, is of the type shown at box 697.

With regard to the Management Components of this example, various components were provided that were responsible for managing the initial deployment and the run time availability of the managed environment.

Figure 7:
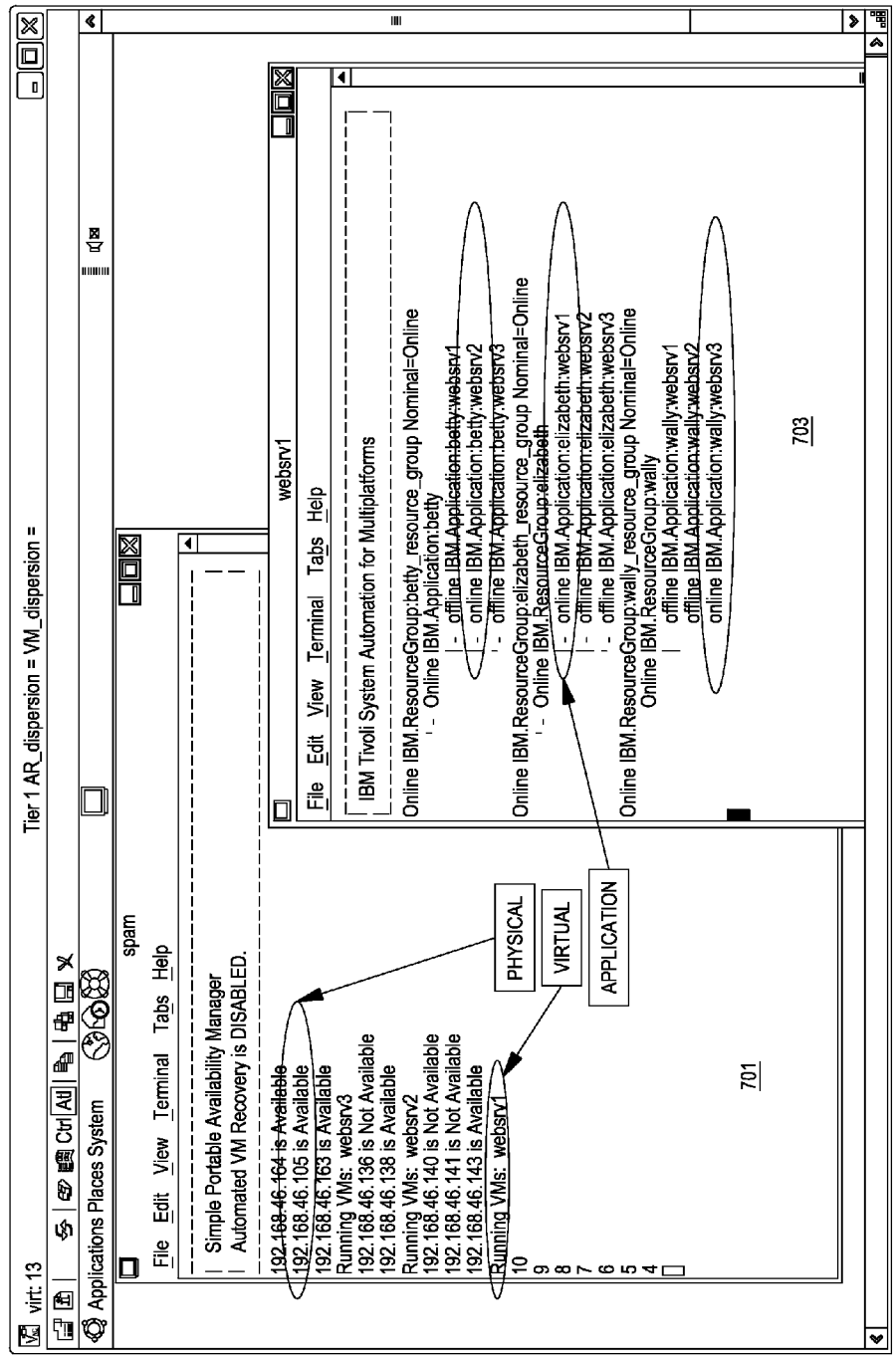
FIG. 7 is screenshot of a software program according to an embodiment of the present invention.

In this example, a "Simple Portable Availability Manager" (SPAM) (box 687) may be implemented in lieu of the product-level VMControl software. See also, FIG. 7, showing Simple Portable Availability Manager Window 701 and websrv1 window 703. In this example, this SPAM component is responsible for collecting all hardware and software inventory, assessing the health of the physical servers and their associated hypervisors, detecting architectural incompatibilities, and assessing the health of each VM for which it is responsible.

When asked to perform a VM deployment, SPAM intakes the list of physical and virtual servers and the Resilience Tier, dynamically constructs the VRPS Advice files containing architectural compatibility and AntiCollocation constraints, requests a placement from the VRPS prototype code, and executes the VM placement using ssh sessions to the dom0. When asked to perform runtime Availability Management, SPAM monitors all the VMs for which it is responsible, using both ssh commands into dom0 and ssh commands into the VM itself to assess its health. If the VM fails, then SPAM instructs the dom0 to confirm delete the VM and then restarts that VM on the same server.

SPAM also monitors all Physical Servers using ssh commands into dom0. If one or more Physical Server fails, then SPAM removes that Physical Server(s) from its configuration file, makes another call into VRPS to determine new placements of the orphaned Virtual Machines, and executes a redeployment process for those VMs.

When (for example) Resilience Tier 5 is enabled, Tivoli Systems Automation monitors all Application Resources using the "monitor" method of the resource management scripts, and executes the "start" scripts either locally or remotely when the resource is determined to have failed. TSA is configured by the Resilience Framework Orchestrator as described below. In this example, the central component that configures, initializes, and to a lesser degree orchestrates the above-mentioned components is the Resilience Framework Orchestrator. It intakes the list of Application Resources and their associated TSA resource definition files and management scripts, the list of VMs, the list of Physical Servers, the Resilience Tier, and the AR and VM_Dispersions.

When asked to deploy a particular Resilience Tier, the Orchestrator (in this example) performs the following functions:

1. Deploys VMs. This entails harvesting the description of the Physical Server Ensemble, creating architectural compatibility constraints, creating VM AntiCollocation constraints based on VM_dispersion, calculating an initial VM placement, and deploying and starting the VMs using ssh commands to dom0.
2. Deploys TSA Application Resources. This entails harvesting the description of the deployed VMs, calculating AR AntiAffinity constraints based on AR_dispersion, creating TSA AR definitions, creating the TSA domain and AR deployment script (which includes the mkrel commands listed above if needed) and, finally, starting the TSA resources using ssh commands into the VMs selected to host the resources.
    a. If Resilience Tier 5 is requested, then full TSA automation is enabled using the TSA samctrl-M F command.
    b. If Resilience Tier 4 is requested, then TSA automation is disabled using the TSA samctrl-M T command.

In one example, the Orchestrator is not involved in the various failure recoveries outlined above. In another example, the Orchestrator may be involved in the various failure recoveries. In this regard, consider the following case, having a Resilience Tier 5 configuration in which both WAM and VAM are engaged:

1. When a VM vanishes either due to a VM failure or a server failure, TSA typically responds first and recovers the affected ARs on another VM (this may result in a race condition that may need to be managed). TSA-driven recovery may or may not violate an AR AntiAffinity constraint, depending on how many VMs are remaining after the failure. That is immaterial to the point at hand.
2. Since VAM is engaged, it will eventually restart that VM, either on the same Physical Server or on another Physical Server. In one example model the VM image could be restarted from an arbitrary state, ranging from an image of the crashed VM, to a checkpointed VM, to a genesis VM image.
3. Without a full investigation of the configuration of this recovered image, there is typically no way of knowing what TSA configuration has been performed on that VM image, and therefore the safest thing to do may be to embark on a full TSA configuration of the image. Additional involvements may be necessary because, depending on the state of the failed image, it may automatically rejoin the TSA cluster, or it (and the TSA cluster itself) may have to be reconfigured to allow that VM to rejoin the cluster.

4. Therefore, in one example, the Orchestrator must perform a TSA configuration of any VM images that the VAM recovers. This example demonstration performs all known configurations necessary to fully restore the resilience configuration, but this does point out the likely necessity for the Orchestrator to be involved in failure recoveries.

Reference will now be made to a number of High-Level Commands used to Deploy according to an embodiment of the present invention (this section contains a list and brief description of the major scripts used by a demonstration of a Resilience Framework Orchestrator):

RF_deploy_Framework <Resilience_Tier> <AR_dispersion> <VM_dispersion> <Physical Server List> <Virtual Machine List>

This top-level script deploys the VMS, prepares the TSA cluster, and deploys the TSA application Resources via invocation of the lower level scripts described below. In this demo, the TSA resources are listed in a separate directory that is automatically scanned by the scripts. In another example, directory path is an argument.

RF_deploy_VMs <Resilience_Tier> <VM_dispersion> <Physical Server List> <Virtual Machine List>

This script deploys and starts the VMs on <Virtual Machine List> onto <Physical Server List> and sets up the anticollocation constraints and availability management according to the Resilience Tier.

RF_prep_TSA_cluster <Resilience_Tier> <AR_dispersion> <Virtual Machine List>

This script prepares and starts the TSA domain consisting of <Virtual Machine List> to accept the Application Resources.

RF_deploy_TSA_resources <Resilience Tier> <AR_dispersion> <Virtual Machine List>

This script dynamically creates and deploys the TSA metadata (resource management scripts and resource definition files) to the <Virtual Machine List> based on the list of desired TSA resources contained in a separate directory. This routine also creates and executes the mkrel commands to create any needed AntiAffinity constraints, and creates and executes the samctrl command to enable or disable TSA automation.

RF_recover_VM_TSA <Resilience_Tier> <VM_dispersion> <Virtual Machine List> <Physical Machine List>

This script is responsible for orchestrating the recovery of a VM following a VM failure. Based on the virtual machines that are supposed to be running as indicated by <Virtual Machine List>, the currently available Physical Servers as indicated by <Physical Server List>, this script determines whether any VMs are missing, calculates a placement for said VMs according to the Resilience Tier, and deploys and starts them.

In addition, it performs a bit of WAM/VAM orchestration in that it has to wait for the TSA cluster to notice (or not) the newly recovered VM and, if the VM is not properly added to the TSA cluster, force the TSA cluster to accept it.

SPAM <Resilience Tier> <Physical Server List> <Automated Recovery Mode>

This script is started in the background to periodically poll the list of Physical Servers, determine the Virtual Machines running on them, and, if a VM goes missing and Automated Recovery Mode is enabled, invokes RF_recover_VM_TSA.

Various utility scripts, not listed here, may inject Application Resource, Virtual Machine, and Physical Server failures, restore failed components, shut down the TSA resources, disband the TSA cluster, and/or shut down the Virtual Machine collection.

Reference will now be made to a number of example demo scenarios according to an embodiment of the present invention (in this demo, there were four Physical Servers capable of running the workload, three VMs, and three ARs):

1. Resilience Tier 4 Deployment and Operation
   1.1. RF_deploy_Framework Tier 4, AR_dispersion=1, VM_dispersion=1 (No WAM, VAM only)
   1.2. Resilience Tier 4 Application Resource Recovery
      Shoot AR, show that no recovery occurs since WAM is nonexistent
      Manually restore AR
   1.3. Resilience Tier 4 VM Recovery
      Shoot VM, show that VM recovery occurs
      But no AR recovery since WAM is nonexistent and AR is not in OS init table
      Manually restore AR
2. Resilience Tier 5 Deployment and Operation
   2.1. RF_deploy_Framework Tier 5, AR_dispersion=1, VM_dispersion=1 (WAM and VAM)
   2.2. Resilience Tier 5 Application Resource Recovery
      Shoot AR, show that recovery occurs
   2.3. Resilience Tier 5 VM Recovery
      Turn off SPAM automated recovery so there can be control regarding how fast things occur.
      Shoot VM, show that AR recovery occurs on another VM
      Manually restore VM, show that VM is rejoined to the TSA domain and AR redundancy is restored
   2.4. Resilience Tier 5 Physical Server Recovery
      Shoot Physical Server, show that AR recovery occurs
      Manually restore VM on another server, show that AR redundancy is restored Reference will now be made to Analysis of Resilience Tiers according to an embodiment of the present invention.

It is generally inconsistent with the simplification principles of the Resilience Framework to expect most customers to be concerned with behavioral and spatial composition, dispersions, resilience orchestration, and so forth. They would typically be more interested in the resilience of their workload and the cost required to achieve it, and, specifically, the resilience of their workload in terms of resilience figures of merit described herein In this regard, a reliability-oriented workload (such as a SOA or e-Commerce workload) is one in which the predominant concern is to meet a minimum Service Level Agreement at each point in time. Such workloads require that a given minimum number of Application Resources be available at all times in order to provide acceptable throughput, and are impacted by the number of Application Resources that are disabled at any given time by one or more Service Degradation Events. For such a reliability-oriented workload the FOM to be minimized may be the probability that fewer than a given baseline number of Application Resources required to meet an SLA are available at any point in time. For the purposes of this example, this FOM is denoted as: P(SLA Violation).

There are a number of possible usages of the modeling. The usage demonstrated in this example is to determine the parameters (e.g., number of spare ARs, dispersions and so forth) necessary for a new deployment to meet the FOM within a Tier.

Reference will now be made to a Modeling Strategy according to an embodiment of the present invention.

Since, for this example, it is presumed that customers want to specify P(SLA Violation), it is necessary to transform those requirements into actionable parameters such as number of ARs, VMs, Physical Servers, and Dispersions. Determination of these parameters such that they meet these customer specifications constitutes a multidimensional search problem that can be formulated as (this is an outline of an example algorithm for transforming a customer's Resilience FOM requirement into a spatial composition mapping):

Given:
  Resilience Tier, Number of ARs needed to meet the SLA, and max P(SLA Violation)
  search
    # ARs, AR_Dispersion (implying # VMs), and VM_Dispersion (implying #Physical Servers)
  to meet the requirements
    P(SLA Violation)<max P(SLA Violation)
  while minimizing
    Cost in terms of number of servers, VMs, and ARs.

An example method for performing analytical optimizations (e.g., to meet the requirements x while minimizing y) that may be used in the context of various embodiments of the present invention may be found in US patent publication 2009/0157855, filed Feb. 21, 2009 in the name of Adam et al., entitled DECENTRALIZED APPLICATION PLACEMENT FOR WEB APPLICATION MIDDLEWARE (the entire contents of which is incorporated by reference herein).

Once the # ARs and the Dispersions are found, it is possible to map these settings into the spatial compositions of specified AMs as outlined in this disclosure.

Also calculated may be the expected duration (MTTR in hours) of an SLA violation, and the expected time between individual Service Degradation Events that may or may not cause an SLA violation (this is not to be confused with SLA violations, but is mainly a measure of availability management activity). Reference will now be made to a Model Description according to an embodiment of the present invention. An example analytical model to demonstrate the principle is presented. Reasonable assumptions are made about, e.g., failure and recovery rates, such that results are valid over a wide range of reasonable possibilities. Modeling assumptions are discussed further below.

In a search and optimization loop according to one embodiment, the figures of merit are calculated as follows (Calculation of the Probability that SLA is Violated due to Multiple Concurrent Service Degradation Events):

Given a configuration containing a certain number of Application Resources, Virtual Machines, and Physical Servers, and assuming equitable Dispersions of all resources, the probability that a given number of Application Resources is not available at any given time (and hence, the SLA is potentially violated) is computed by brute-force enumerating all possible combinations of AR, VM, and Physical Server failures, calculating how many ARs are available for each combination of failures, and computing the probability of the occurrence of that combination given the failure and recovery rates of each component. If the number of ARs in a particular failure combination is not sufficient to meet the desired SLA, then the probability of SLA violation is incremented by the probability of that configuration (in one specific example, optimizing the placement of 500 ARs using this calculation takes about 4 seconds on a T61p.).

Reference will now be made to a Model Usage and Results according to an embodiment of the present invention.

As mentioned earlier, various embodiments of the present invention may provide an analytical modeling framework that is used to buffer the customer from the details of the configuration and allow them to view the resilience of their system in terms that have business significance to them. Thus, this modeling may be used to determine the lowest-cost configuration given the number of Application Resources the customer needs to accomplish their business objectives, and the maximum allowable probability that that number of ARs is not available. An example of this usage is provided here.

Suppose, for example, that the customer specifies that he needs at least 500 ARs to meet his SLA, and will accept at most a 0.0001 probability that 500 ARs are not available. All this is to be achieved at the lowest cost.

Referring first to, for example, Resilience Tier 5 (in this example, Resilience Tier 5 is the case in which both WAM and VAM are engaged):

TABLE 3

| Input parameters | | |
| --- | --- | --- |
| Component | MTBF, Hours | MTTR, Hours |
| Physical Server | 10000. | 0.083 |
| Hypervisor | 2000. | 0.083 |
| VM | 2000. | 0.083 |
| AR | 1000. | 0.083 |

TABLE 4

| Optimization Results | | | | | | | |
| --- | --- | --- | --- | --- | --- | --- | --- |
| svrs | vms_svr | vms | ARs_vm | ARs | MTBSDE | MTTR_SLA_Viol | P(SLA_Viol) |
| 1 | 1 | 1 | 500 | 500 | 2.00 | 0.09 | 4.072509e−02 |
| 3 | 17 | 51 | 10 | 510 | 1.86 | 4.20 | 2.372791e−04 |
| 4 | 13 | 52 | 10 | 520 | 1.82 | 4.57 | 1.991574e−04 |
| 11 | 5 | 55 | 10 | 550 | 1.71 | 0.07 | 2.346053e−05 |

The table above (optimization results) shows the summary output of the example optimization run (regarding Resilience Tier 5) as it walks out into the search space starting with the lowest cost point (i.e., no spare ARs, and all Dispersions equal to 0). Each row of the table represents an improvement with respect to P(SLA Violation) over the preceding row.

For this optimization example (which took about 4 seconds to compute on a T61p), if 500 ARs are needed and a maximum acceptable probability of having fewer than 500 ARs is 1.000000e−04, then the minimum cost configuration is 11 servers, 5 VMs per server, 55 VMs, 10 ARs per VM, and 550 ARs (in another example, a smaller cost configuration can probably be found at the expense of more computation time, by increasing the search granularity and/or searching more intelligently.)

Reference will now be made to, for example, Resilience Tier 4 (In this example, the modeled difference between Resilience Tier 5 and Resilience Tier 4 is that there is no White Box Availability Manager. The analytical impact of this is that the mean time to recover the AR is not 5 minutes, an interval consistent with automated recovery, but increased (arbitrarily) to 50 minutes, an interval considered to be on the time scale to get a human administrator to pay attention to and manually restart the AR):

TABLE 5

Input parameters

| Component | MTBF, Hours | MTTR, Hours |
|---|---|---|
| Physical Server | 10000. | 0.083 |
| Hypervisor | 2000. | 0.083 |
| VM | 2000. | 0.083 |
| AR | 1000. | 0.83 <<<<< |

TABLE 6

Optimization Results

| svrs | vms_svr | vms | ARs_vm | ARs | MTBSDE | MTTR_SLA_Viol | P(SLA_Viol) |
|---|---|---|---|---|---|---|---|
| 1 | 1 | 1 | 500 | 500 | 2.00 | 0.56 | 3.380639e−01 |
| 3 | 17 | 51 | 10 | 510 | 1.86 | 11.91 | 8.650216e−04 |
| 4 | 13 | 52 | 10 | 520 | 1.82 | 45.62 | 1.998299e−04 |
| 11 | 5 | 55 | 10 | 550 | 1.71 | 0.54 | 1.858381e−04 |
| 15 | 4 | 60 | 9 | 540 | 1.73 | 3.71 | 1.988057e−06 |

The table above (optimization results) shows the summary output regarding Resilience Tier 4. For this optimization example, if 500 ARs are needed and a maximum probability of having fewer than 500 ARs is 1.000000e−04 (same as the Tier 5 requirements), then the minimum cost configuration is 15 servers, 4 VMs per server, 60 VMs, 9 ARs per VM, and 540 ARs.

In another example, the optimization loop may be enhanced to minimize both the P(SLA Violation) and the MTTR_SLA_Viol. In such analysis, the objective function may be a vector, not a scalar.

Reference will now be made to a number of Analytical Modeling Assumptions according to an embodiment of the present invention:
1 MTBFs and MTTRs are representative, not actual
2 Only one resource fails at a time
3 Instantaneous failure detection
4 Accurate failure identification
5 Repairs are deterministic
6 All SW failures are transient, and all HW failures are permanent
7 Constant failure rates for all resources
8 Resource failures are independent
9 No VM or Svr capacity limitations enforced.
10 Workload is gracefully degradable—loss of service is linearly proportional to number of unavailable Service Units
11 Stop clock during failure handling
12 HW fails are uncorrelated Reference will now be made to a number of typical customer use cases according to an embodiment of the present invention:
A customer might want to specify a given SLA for the VMs in a given ensemble, and have assurance that that SLA can be met by the selected availability policy, and what resources would be required to meet that SLA. Given that we know the response time capabilities and overheads of that SLA, embodiments of the invention may compute whether a given ensemble can support it, and at what cost.

A customer might have only a limited set of resources and want to know what is the best SLA that can be provided given those resources. Embodiments of the invention can do the reverse calculation.

A customer might predict a growing workload or contemplate a configuration change, and would want to know whether existing SLA can be met for that new, larger workload, and at what cost (which would vary as a function of the workload). Embodiments of the invention can provide answers.

The ensemble itself might predict a growing workload, or undergo a configuration change, and could in response assess whether it can continue to meet its SLA without calling for additional resources.

Given that the costs and value of a given SLA are known, the customer can bill based on the SLA. Embodiments of the invention can provide answers.

SLAs may be different at different times of day, days of the week or month, etc. Either the recovery action or the resources included can change. Embodiments of the invention may either respond to a strict calendar or learn/anticipate the changing workloads and adapt the SLA. The appropriate SLA could be identified for a given operational profile using machine learning and/or reinforcement learning.

Reference will now be made to a number of Deployment Options according to an embodiment of the present invention. The framework may admit sufficient generality to allow deployment into multiple environments, using multiple deployment engines. Two examples are Tivoli's TSAM, and the open source XCAT tool.

TSAM—In one example, augment the TSAM dependency model and TSAM execution environment to support this resource relationship mode and the capabilities that are required. Use TSAM to allow a customer to specify a resilience policy at the highest level of a service stack (application service), and automatically create resources upon which that application service depends (and their dependencies), and automatically propagate all availability policies to all resources on which that high level resource depends. This may include automatically adding additional resources to the service topology to meet the needed availability goals. This results in a reusable Service Template that meets availability goals.

Transform TSAM customer-defined service topologies and work flows into EM API and manipulatives (as available, may opportunistically use, for example, existing CAM APIs, or may use an appropriate ensemble definition). For example:
Define "ensemble" as a TSAM resource.
Define ensemble attributes (including availability policies).

Define ensemble manipulatives using EM API.

Define storage ensemble manipulatives necessary to set up CAM's FC LUN (optional)

Define and implement work flows necessary to deploy an availability ensemble.

Implement TSAM-driven definition and deployment of a customer-defined Virtual System Collection, with particular availability properties, on ensemble (see, e.g., element 305 of FIG. 3).

XCAT—In one example, work with Toks to deploy/set up KVM ensembles using perl module through REST API.

Reference will now be made to another embodiment of the present invention. This embodiment may provide for a combination of definitional, instrumentation, experimental measurement, and analytical tasks:

Define the quantitative attributes of an SLA. These metrics should be relevant to daily customer agita due to planned and unplanned outages, and represent the capabilities of current and planned availability products. Planned outage metrics could include PFA prediction horizon, evacuation capability, evacuation time and overhead. Unplanned outage metrics could include response time, recovery time, recovery point. Overhead metrics could include cpu/network/storage monitoring overheads, costs of checkpointing etc. An interesting area is the case of degraded performance due to faults or high overhead, and how that is to be viewed; a system that isn't sending out failure event notifications but is slowly choking is a not uncommon and difficult problem. If it's known that there is a recovery action that can get it going again, it makes sense to do it.

Define the SLAs that can be currently supported by CAM, as well as others (e.g., active replication) that could be supported in the future.

Set up a CAM cluster and assess different recovery policies and their effectiveness and cost, under a collection of defined workloads. On example would parameterize an SLA attribute (e.g., performance overhead) as a function of a workload attribute (e.g., CPU utilization, I/O rate). When done, there is a matrix of SLAs versus cost versus workload that can be used in generating an analysis framework to be used in customer-desired what-if assessments and simulations of recovery and failover.

Define the what-if questions that a customer needs to have answered, given this analytical capability.

Construct the Resource Relationship Model necessary to support this analytical framework.

Construct an analytic framework utilizing machine learning and reinforcement learning that can utilize these correlations to assess the various what-if questions that a customer, or the ensemble itself, needs to ask.

Provide White and Black Box Availability Management.

Reference will now be made to a Workload Specification according to an embodiment of the present invention.

In this example, a workload (WL) consists of a virtual machine, an operating system image, a virtualized application, a non-virtualized application, an LPAR, an xLPAR, a WPAR or other logical container for computing work which can be assigned resource requirements (CPU, memory, etc), constraints (location, collocation, anticollocation, etc), start and stop order dependencies, priorities, and a value indicating the "color" of the WL, which is described below. The workload resource requirements can be provided via the WL image information, system administration, or from a workload characterization and specification tool such as TSAM.

Note that the systems and methods of this disclosure are equally applicable without loss of generality to non-virtualized workloads, combinations of virtualized and non-virtualized workloads, application virtualization containers, xLPAR partitions, and WPARs. The term "WL" may be used to refer to individual units of work in any such environment.

Figure 8:
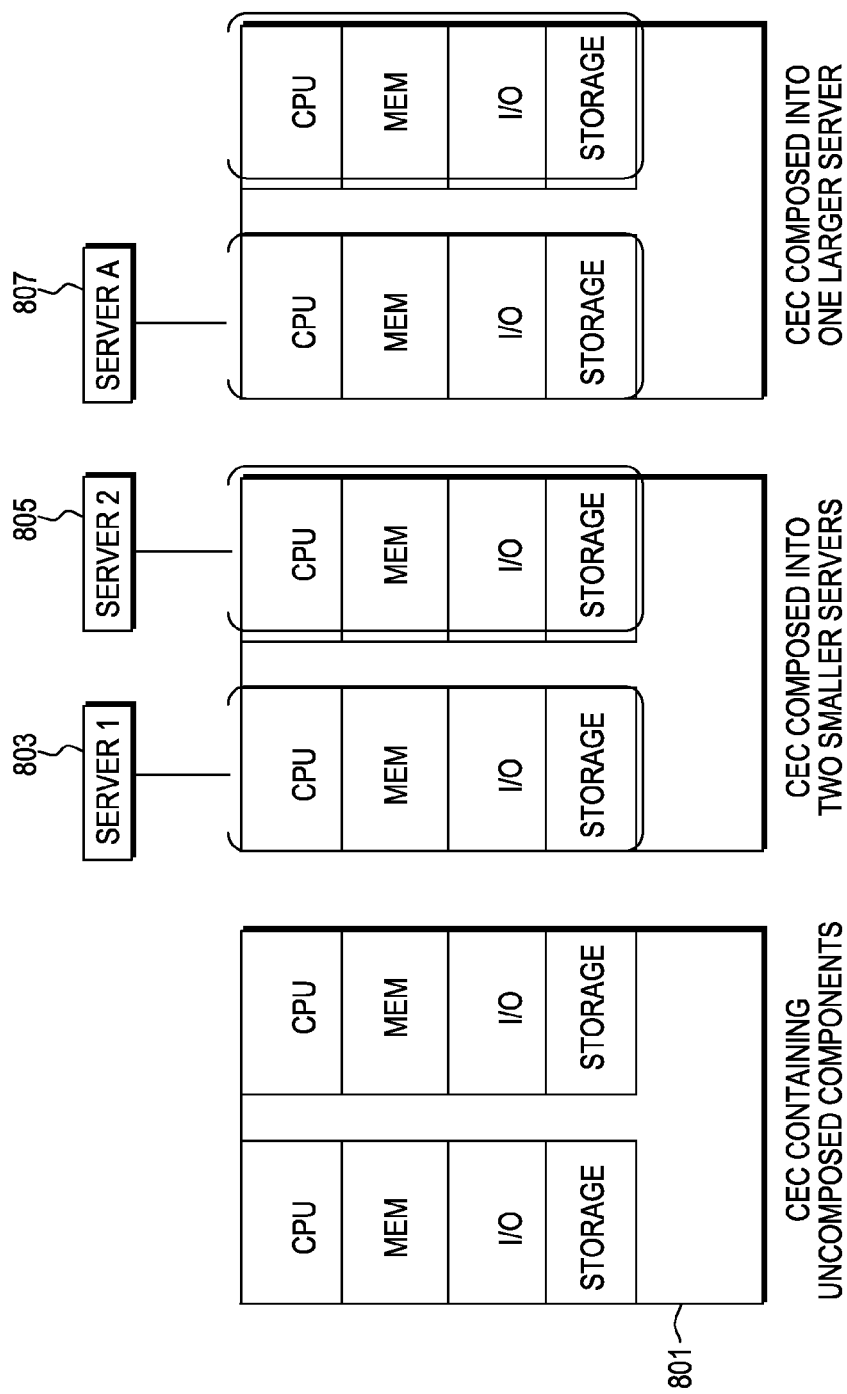
FIG. 8 is a block diagram of a system according to an embodiment of the present invention.

Reference will now be made to a Hosting Environment Specification according to an embodiment of the present invention (see, FIG. 8).

Hardware in this example is considered to be a collection of "Components" that reside in one or more Central Electronics Complexes (CECs). Such Components include but are not limited to CPUs, caches, Memory, I/O, and Storage, none of which are assumed to be totally homogeneous. In this example, in and of themselves, Components cannot be used as a Server. However, in a highly configurable design such as (e.g., Phoenix), Components may be flexibly composed to create a "Logical Server" of a desired size. Thus, a CEC (shown as element 801 on the left in FIG. 8) containing two CPU Components, two Memory Components, two I/O Components, and two Storage Components could be composed into two smaller Logical Servers (shown as Server 1—element 803 and Server 2—element 805 in the middle in FIG. 8) each containing one of each Component, or one larger Logical Server (shown as Server A—element 807 on the right in FIG. 8) containing all Components. CECs containing more or fewer Components can of course be engineered and this disclosure is intended to apply to any number of CECs containing any number of Components.

Furthermore, Logical Servers can sometimes be composed from Components that reside in different CECs, with a possible loss in performance because the Components may be further apart than when they are in the same CEC. Finally, in some cases, Components cannot be combined with each other at all because, for example, they are in different CECs and there is no electrical connection between them, or because they are architecturally incompatible.

Reference will now be made to a Resource Relationship Modeling of Composable Hardware according to an embodiment of the present invention.

In this example, each Component (CPU, memory, . . . ) may be viewed as a node in a Resource Relationship graph. This graph is called the Hardware Resource Graph (HRG). Two Components can be composed to constitute part or all of a Logical Server if they are connected by a Composability Relationship in the Hardware Resource Graph. If Components are not connected by a Composability Relationship, then they cannot be composed together to constitute part or all of a Server, perhaps either because they are architecturally incompatible, not resident in the same CEC, or any other reason.

Edges can be, for example: cost (performance), cost (time to reconfigure).

One extension to this scheme would be to associate a cost between any two Components that could potentially be composed, to allow expression of locality, preference, or other measure of how desirable/costly it would be to compose these Components.

As defined above, the Resource Graph of this example only allows the description of the potential resource compositions. To allow the description of an actualized resource composition into a Logical Server, an overlay graph (that is a subset of the Resource Graph) may be defined called the Composed Hardware Resource Graph. In this graph, an edge between any two resources indicates that those two resources have been composed into a part of a Logical Server. Note that for the composition to be valid, the edges in the Composed Resource Graph must be a subset of the edges in the Hardware Resource Graph. Hardware Resources that have been composed into a Logical Server are unioned in the Resource graph according to the union rules of the Resource Relationship Modeling framework.

In addition to flexibly composing Logical Servers from Components, a further degree of configuration is possible in terms of creating firmware partitions within a Server (Logical or otherwise), as is possible in the xLPAR or PowerVM technologies. This constitutes another level of configurability, equivalent to statically assigning workloads to a server, and may be addressed as a Workload Placement Services capability.

In another example, allocation and configuration of storage based on resource requirements may be provided.

In various embodiments of the present invention a broad concept for configuring the settings of complex combinations of resiliency management software for virtual machines and applications based on simplified resiliency settings is provided. Of note, the disclosed framework may be capable of one or more of the following:

- Configuring the resilience-related parameters of an external table (e.g., automatically based on the customer-supplied resilience setting).
- Providing for failover that may be automatically configured and integrated into a larger resilience architecture.
- Providing for resiliency at the customer level and the automatic transformation of that resilience specification into the configuration of virtual machine and application-level availability managers.
- Providing for a "subway map" concept (an extremely high level and generic way to track the steps involved in the ITIL process of providing and assessing high availability) and various ITIL steps to be implemented to invoke the interfaces and functions of the resilience framework disclosed herein.
- Simplifying the conventional complex configuration, setup up and operational steps related to processing and the like via automation based on simplified customer resilience settings (thus relieving the administrator of performing these steps).
- Simplifying the conventional complex configuration, setup up and operational steps related to storage and the like via automation based on simplified customer resilience settings (thus relieving the administrator of performing these steps).

Figure 9:
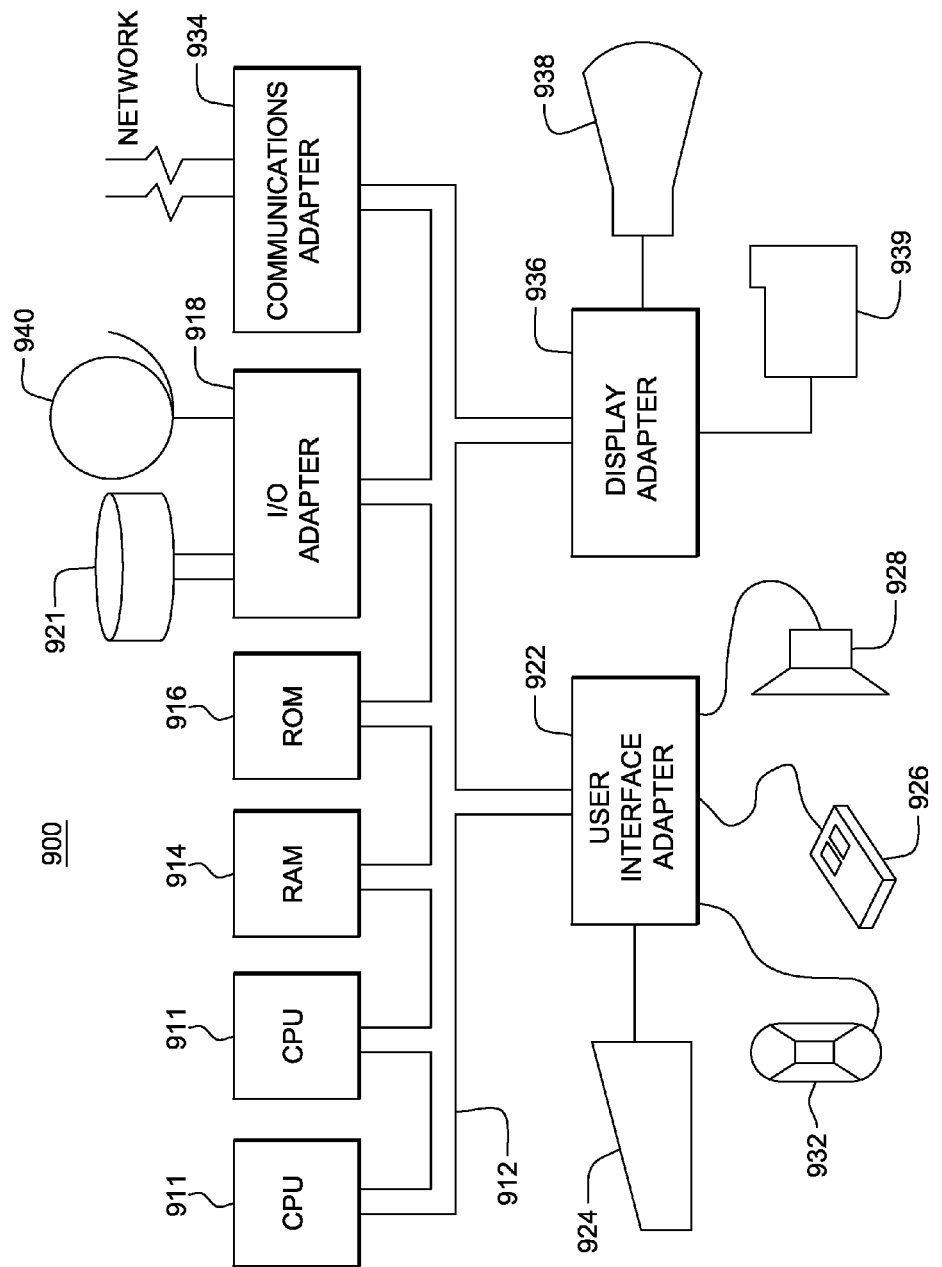
FIG. 9 is a block diagram of a system according to an embodiment of the present invention.

Referring now to FIG. 9, this FIG. shows a hardware configuration of computing system 900 according to an embodiment of the present invention. As seen, this hardware configuration has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communications adapter 934 for connecting the system 900 to a data processing network, the Internet, an Intranet, a local area network (LAN), etc., and a display adapter 936 for connecting the bus 912 to a display device 938 and/or printer 939 (e.g., a digital printer or the like).

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer-implemented system for configuring at least a first availability manager and a second availability manager, the system comprising:
 a user interface, wherein the user interface receives from a user an availability management goal associated with at least: (a) the first availability manager, and (b) the second availability manager;
 a processing element in operative communication with the user interface, wherein the processing element determines, based at least in part upon the availability management goal: (a) at least one setting associated with the first availability manager, and (b) at least one setting associated with the second availability manager; and
 a control element in operative communication with: (a) the processing element, (b) the first availability manager, and (c) the second availability manager;
 wherein the control element receives from the processing element the at least one setting associated with the first availability manager and provides to the first availability manager the associated setting;
 wherein the control element receives from the processing element the at least one setting associated with the second availability manager and provides to the second availability manager the associated setting;
 wherein the first availability manager comprises a white box availability manager and the second availability manager comprises a black box availability manager;
 wherein the white box availability manager is configured to detect and respond to at least one failure associated with at least one application level resource;
 wherein the black box availability manager is configured to detect and respond to at least one failure associated with at least one virtual machine;
 wherein the white box availability manager is configured to perform at least one action that the black box availability manager is not configured to perform;
 wherein the white box availability manager and the black box availability manager are in a hierarchical composition such that the control element causes:
  (a) upon failure of a first virtual machine operating on a first physical server: (i) the white box availability manager to recover each affected application level resource on a second virtual machine that is distinct from the first virtual machine that has failed; (ii) the black box availability manager to recover the first virtual machine on the first physical server; and (iii) the white box availability manager to restart, when the first virtual machine recovers, the affected application level resources to maintain at least one anti-affinity constraint;
  (b) upon failure of the first physical server that had been running the first virtual machine: (i) the white box availability manager to recover each affected application level resource on a second virtual machine that is distinct from the first virtual machine that had been running on the first physical server; (ii) the black box availability manager to recover the first virtual machine on a second physical server that is distinct from the first physical server; and (iii) the white box availability manager to restart, when the first virtual machine recovers on the second physical server, the affected application level resources to maintain at least one anti-affinity constraint;
 wherein the white box availability manager and the black box availability manager are concurrently active; and
 wherein the white box availability manager and the black box availability manager are implemented at least in part as hardware.

2. The system of claim 1, wherein the user interface receives the availability management goal from the user via a network.

3. The system of claim 1, wherein the availability management goal comprises one value from a predetermined set of quantized values.

4. The system of claim 3, wherein the predetermined set of quantized values are provided to the user via the user interface.

5. The system of claim 4, wherein the user interface is configured to receive from the user a selection of one value from the set of predetermined quantized values.

6. The system of claim 1, wherein: the processing element determines, based at least in part upon the availability management goal, a spatial composition associated with the first availability manager and the second availability manager;
the spatial composition is reflected in the at least one setting associated with the first availability manager that is determined by the processing element; and
the spatial composition is reflected in the at least one setting associated with the second availability manager that is determined by the processing element.

7. The system of claim 1, wherein:
the processing element determines, based at least in part upon the availability management goal: (a) a behavioral composition associated with the first availability manager, and (b) a behavioral composition associated with the second availability manager;
the behavioral composition associated with the first availability manager is reflected in the at least one setting associated with the first availability manager that is determined by the processing element; and
the behavioral composition associated with the second availability manager is reflected in the at least one setting associated with the second availability manager that is determined by the processing element.

8. The system of claim 1, wherein:
the processing element determines, based at least in part upon the availability management goal: a spatial composition associated with the first availability manager and the second availability manager;
the processing element determines, based at least in part upon the availability management goal: (a) a behavioral composition associated with the first availability manager, and (b) a behavioral composition associated with the second availability manager;
the processing element determines, based at least in part upon the spatial composition and the behavioral composition associated with the first availability manager, a grammatical construct for expressing the spatial composition and the behavioral composition associated with the first availability manager to the first availability manager; and
the processing element determines, based at least in part upon the spatial composition and the behavioral composition associated with the second availability manager, a grammatical construct for expressing the spatial composition and the behavioral composition associated with the second availability manager to the second availability manager.

9. The system of claim 8, wherein:
the grammatical construct for expressing the spatial composition and the behavioral composition associated with the first availability manager is reflected in the at least one setting associated with the first availability manager that is determined by the processing element; and
the grammatical construct for expressing the spatial composition and the behavioral composition associated with the second availability manager is reflected in the at least one setting associated with the second availability manager that is determined by the processing element.

10. The system of claim 1, wherein the configuring includes controlling failure handling and a behavior of at least one of: (a) the first availability manager while the first availability manager is in a post-initialized state, and (b) the second availability manager while the second availability manager is in a post-initialized state.

11. The system of claim 10, wherein the configuring includes controlling the failure handling and the behavior, in real time, of at least one of: (a) the first availability manager, and (b) the second availability manager.

12. The system of claim 1, wherein the configuring includes initializing at least one of: (a) the first availability manager while the first availability manager is in a pre-initialized state, and (b) the second availability manager while the second availability manager is in a pre-initialized state.

13. The system of claim 1, wherein:
each of the white box availability manager and the black box availability manager is subject to a top-level constraint;
each of the white box availability manager and the black box availability manager is limited in scope to a respective sphere of interest; and
each of the white box availability manager and black box availability manager concurrently performs functions based on the to level constraint.

14. A method implemented in a computer system for configuring at least a first availability manager and a second availability manager, the method comprising:
providing a user interface, wherein the user interface receives from a user an availability management goal associated with at least: (a) the first availability manager, and (b) the second availability manager;
determining, based at least in part upon the availability management goal: (a) at least one setting associated with the first availability manager, and (b) at least one setting associated with the second availability manager;
providing the at least one setting associated with the first availability manager to the first availability manager; providing the at least one setting associated with the second availability manager to the second availability manager; and
running a program using a processor to execute one or more of steps of: (a) providing a user interface; (b) determining; (c) providing the at least one setting associated with the first availability manager to the first availability manager; and (d) providing the at least one setting associated with the second availability manager to the second availability manager;
wherein the first availability manager comprises a white box availability manager and the second availability manager comprises a black box availability manager;
wherein the white box availability manager is configured to detect and respond to at least one failure associated with at least one application level resource;
wherein the black box availability manager is configured to detect and respond to at least one failure associated with at least one virtual machine;
wherein the white box availability manager is configured to perform at least one action that the black box availability manager is not configured to perform; wherein the white box availability manager and the black box availability manager are in a hierarchical composition such that the processor causes:
(a) upon failure of a first virtual machine operating on a first physical server: (i) the white box availability manager to recover each affected application level resource on a second virtual machine that is distinct from the first virtual machine that has failed; (ii) the black box availability manager to recover the first virtual machine on the first physical server; and (iii) the white box availability manager to restart, when the first virtual machine recovers, the affected application level resources to maintain at least one anti-affinity constraint;
(b) upon failure of the first physical server that had been running the first virtual machine: (i) the white box availability manager to recover each affected application level resource on a second virtual machine that is distinct from the first virtual machine that had been running on the first physical server; (ii) the black box availability manager to recover the first virtual machine on a second physical server that is distinct from the first physical server; and (iii) the white box availability manager to restart, when the first virtual machine recovers on the second physical server, the affected application level resources to maintain at least one anti-affinity constraint;
wherein the white box availability manager and the black box availability manager are concurrently active; and
wherein the white box availability manager and the black box availability manager are implemented at least in part as hardware.

15. The method of claim 14, wherein said steps are carried out in the order recited.

16. The method of claim 14, wherein the configuring includes controlling the failure handling and other behavior of at least one of: (a) the first availability manager while the first availability manager is in a post-initialized state, and (b) the second availability manager while the second availability manager is in a post-initialized state.

17. The method of claim 16, wherein the configuring includes controlling, in real time, the failure handling and other behavior of at least one of: (a) the first availability manager, and (b) the second availability manager.

18. The method of claim 14, wherein the configuring includes initializing at least one of: (a) the first availability manager while the first availability manager is in a pre-initialized state, and (b) the second availability manager while the second availability manager is in a pre-initialized state.

19. The method of claim 14, wherein:
each of the white box availability manager and the black box availability manager is subject to a top-level constraint;
each of the white box availability manager and the black box availability manager is limited in scope to a respective sphere of interest; and
each of the white box availability manager and black box availability manager concurrently performs functions based on the to level constraint.

20. A program storage device readable by machine, tangibly embodying a program of instructions executable by the machine to perform a method for configuring at least a first availability manager and a second availability manager, the method comprising:
providing a user interface, wherein the user interface receives from a user an availability management goal associated with at least: (a) the first availability manager, and (b) the second availability manager;
determining, based at least in part upon the availability management goal: (a) at least one setting associated with the first availability manager, and (b) at least one setting associated with the second availability manager;
providing the at least one setting associated with the first availability manager to the first availability manager;
providing the at least one setting associated with the second availability manager to the second availability manager; and
running a program using a processor to execute one or more of said steps of: (a) providing a user interface; (b) determining; (c) providing the at least one setting associated with the first availability manager to the first availability manager; and (d) providing the at least one setting associated with the second availability manager to the second availability manager;
wherein the first availability manager comprises a white box availability manager and the second availability manager comprises a black box availability manager;
wherein the white box availability manager is configured to detect and respond to at least one failure associated with at least one application level resource; wherein the black box availability manager is configured to detect and respond to at least one failure associated with at least one virtual machine; wherein the white box availability manager is configured to perform at least one action that the black box availability manager is not configured to perform;
wherein the white box availability manager and the black box availability manager are in a hierarchical composition such that the processor causes:
(a) upon failure of a first virtual machine operating on a first physical server: (i) the white box availability manager to recover each affected application level resource on a second virtual machine that is distinct from the first virtual machine that has failed; (ii) the black box availability manager to recover the first virtual machine on the first physical server; and (iii) the white box availability manager to restart, when the first virtual machine recovers, the affected application level resources to maintain at least one anti-affinity constraint;
(b) upon failure of the first physical server that had been running the first virtual machine: (i) the white box availability manager to recover each affected application level resource on a second virtual machine that is distinct from the first virtual machine that had been running on the first physical server; (ii) the black box availability manager to recover the first virtual machine on a second physical server that is distinct from the first physical server; and (iii) the white box availability manager to restart, when the first virtual machine recovers on the second physical server, the affected application level resources to maintain at least one anti-affinity constraint;
wherein the white box availability manager and the black box availability manager are concurrently active; and
wherein the white box availability manager and the black box availability manager are implemented at least in part as hardware.

21. The program storage device of claim 20, wherein the steps are carried out in the order recited.

22. The program storage device of claim 20, wherein the configuring includes controlling the failure handling and other behavior of at least one of: (a) the first availability manager while the first availability manager is in a post-initialized state, and (b) the second availability manager while the second availability manager is in a post-initialized state.

23. The program storage device of claim 22, wherein the configuring includes controlling, in real time, the failure handling and other behavior of at least one of: (a) the first availability manager, and (b) the second availability manager.

24. The program storage device of claim 20, wherein the configuring includes initializing at least one of: (a) the first availability manager while the first availability manager is in a pre-initialized state, and (b) the second availability manager while the second availability manager is in a pre-initialized state.

25. The program storage device of claim 20, wherein:
   each of the white box availability manager and the black box availability manager is subject to a top-level constraint;
   each of the white box availability manager and the black box availability manager is limited in scope to a respective sphere of interest; and
   each of the white box availability manager and black box availability manager concurrently performs functions based on the to level constraint.

* * * * *